(12) United States Patent  
Fernandez et al.

(10) Patent No.: US 7,509,230 B2  
(45) Date of Patent: Mar. 24, 2009

(54) METHOD FOR RATING AN ENTITY

(76) Inventors: Irma Becerra Fernandez, 9965 SW. 125 Terrace, Miami, FL (US) 33176; Leonard Dale Boord, Jr., 8510 SW. 52nd Ave., Miami, FL (US) 33143; Chrysanthos Dellarocas, 325 N. Pitt St., Alexandria, VA (US) 22134

( * ) Notice: Subject to any disclaimer, the term of this patent is extended or adjusted under 35 U.S.C. 154(b) by 159 days.

(21) Appl. No.: 11/601,097

(22) Filed: Nov. 17, 2006

(65) Prior Publication Data  
US 2008/0120166 A1 May 22, 2008

(51) Int. Cl.  
*G06F 15/00* (2006.01)

(52) U.S. Cl. ...................................... 702/179

(58) Field of Classification Search ............. 702/179, 702/182; 705/9, 1; 382/154; 101/91  
See application file for complete search history.

(56) References Cited  
U.S. PATENT DOCUMENTS

| | | | | |
|---|---|---|---|---|
| 2003/0018451 A1* | 1/2003 | Sullivan et al. | ............. | 702/182 |
| 2004/0015329 A1* | 1/2004 | Shayegan et al. | ........... | 702/179 |
| 2004/0153330 A1* | 8/2004 | Miller et al. | .................. | 705/1 |
| 2006/0042483 A1* | 3/2006 | Work et al. | .................... | 101/91 |
| 2007/0014468 A1* | 1/2007 | Gines et al. | ................. | 382/154 |
| 2008/0027783 A1* | 1/2008 | Hughes et al. | ................. | 705/9 |

* cited by examiner

*Primary Examiner*—Tung S Lau  
*Assistant Examiner*—Xiuquin Sun  
(74) *Attorney, Agent, or Firm*—Michael J. Buchenhorner

(57) ABSTRACT

A method for rating an entity includes receiving a bounded rating of the entity, selected from a bounded interval of integers; retrieving a bounded current rating for the entity selected from the bounded interval of integers; transforming the bounded rating into an unbounded rating by applying a functional transformation; then applying the same functional transformation to unbound the current rating; retrieving a reliability score for the rater; retrieving a reliability score for the current rating of the entity; computing a new unbounded rating as a weighted average of the entity's unbounded current rating and unbounded rating; computing a reliability score for the new unbounded rating by adding the rater's reliability score to the current rating's reliability score; and converting the new unbounded rating into a new bounded rating by applying an inverse of the functional transformation used to convert a bounded value into an unbounded value.

26 Claims, 28 Drawing Sheets

METHOD FOR RATING AN ENTITY

CROSS-REFERENCE TO RELATED APPLICATIONS

None.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of information retrieval and more particularly relates to the field of rating an entity.

BACKGROUND OF THE INVENTION

Information technology and the World Wide Web (WWW) have made entering into relationships and transacting business with remote entities an everyday occurrence. Today, activities ranging from signing up for a university course, purchasing a product, selling a product, and screening job applicants are conducted through the Internet, with no face-to-face contact between the parties to the activities. Not only does one not see the person or business at the other end of the transaction, but one rarely has the opportunity to assess the reliability of that person or business. It may be time-consuming and costly to conduct an investigation.

Rating systems, in particular on-line rating systems, are known in the art and are becoming increasingly popular. These rating systems provide a forum for people to rate products, businesses, publications, music, and people. They follow a standard methodology: a user is presented with a person/object to rate and a rating spectrum. The user selects a rating somewhere within the spectrum and that rating is applied to the person/object's current rating. The drawback to these systems is that they are often not reliable because they fail to take into account various factors which may affect a rating. There is no attempt made to rate the raters to determine if a rater is reliable or even real.

Many of these rating systems employ very rudimentary algorithms for determining a rating score. Most simply provide an average score of all ratings, without taking into consideration factors such as raters creating fake identities and posting SPAM ratings for the purpose of inflating the average rating of their friends and/or reducing the average rating of their competitors. Moreover, with many of these systems there is no way to compensate for the age of a rating. For instance, using the example of www.RateMyProfessors.com, assume a teacher was given poor ratings years ago (a two on a scale of one to five). Years later the teacher is receiving consistently favorable ratings, but the favorable ratings are weighted down by the unfavorable ratings posted years ago. With all of the ratings having equal weight, it will take a high volume of current ratings to compensate for the older unfavorable ratings. This builds unfairness and lack of accuracy into the system and also brings up another problem with known rating systems—they perform poorly with few postings because of the bias and time factors.

Therefore there is a need for a method that takes into consideration the factors discussed above to overcome the shortcomings of the prior art.

SUMMARY OF THE INVENTION

Briefly, according to an embodiment of the invention a method for determining a reliable rating for an entity includes steps or acts of: receiving a bounded rating of the entity to be rated from a rater, wherein the bounded rating is a first number selected from a bounded interval of integers; retrieving a bounded current rating for the entity, wherein the bounded current rating is selected from the bounded interval of integers; transforming the bounded rating into an unbounded rating by applying a functional transformation; transforming the bounded current rating into an unbounded current rating by applying the same functional transformation; retrieving a reliability score for the rater; retrieving a reliability score for the current rating of the entity; computing a new unbounded rating as a weighted average of the entity's unbounded current rating and unbounded rating; computing a reliability score for the new unbounded rating by adding the rater's reliability score to the current rating's reliability score; and converting the new unbounded rating into a new bounded rating by applying an inverse of the functional transformation used to convert a bounded value into an unbounded value.

According to embodiments of the present invention, the method accounts for systematic bias which may be introduced into a rating. The method also takes into consideration the time decay of a rating and the reliability of the rater.

The method, according to another embodiment of the present invention, includes steps of: receiving a comment from the rater; binding the comment to the bounded rating; storing the comment in persistent storage; and displaying the comment along with an icon indicating agreement and another icon indicating disagreement, wherein the icons are selectable by a user to indicate either agreement or disagreement with the comment. The method also accepts a selection of the icons and calculates a favorable opinion factor as a sum of the selections of the icons indicating agreement. An unfavorable opinion factor is calculated as a sum of the selections of the icons indicating disagreement.

Another embodiment of the present invention provides a method for assigning a visual indicator to the rating, the visual indicator for providing an indication of the ranking of the rating, based upon a pre-selected tier of rankings. The first tier is associated with a low ranking; the second tier is associated with a medium ranking; and the third tier is associated with a high ranking. The visual indicator is displayed in close proximity to the rating.

A computer program product comprises software instructions for carrying out the above method steps. A system according to an embodiment of the present invention includes: a user interface for interacting with a user; a network connection; a persistent storage such as a database; a memory for storing software instructions; and a processor operatively connected to the memory, the processor for executing the software instructions; wherein the software instructions enable the processor to carry out the method steps described above.

The method can also be implemented as machine executable instructions executed by a programmable information processing system or as hard coded logic in a specialized computing apparatus such as an application-specific integrated circuit (ASIC).

BRIEF DESCRIPTION OF THE DRAWINGS

To describe the foregoing and other exemplary purposes, aspects, and advantages, we use the following detailed description of an exemplary embodiment of the invention with reference to the drawings, in which:

FIG. 25 is a screenshot of the profile main page, according to the present invention.

FIG. 27 is a screenshot of the profile tracking panel, according to the present invention.

FIG. 28 is a screenshot of the promote page, according to the present invention.

Figure 1:
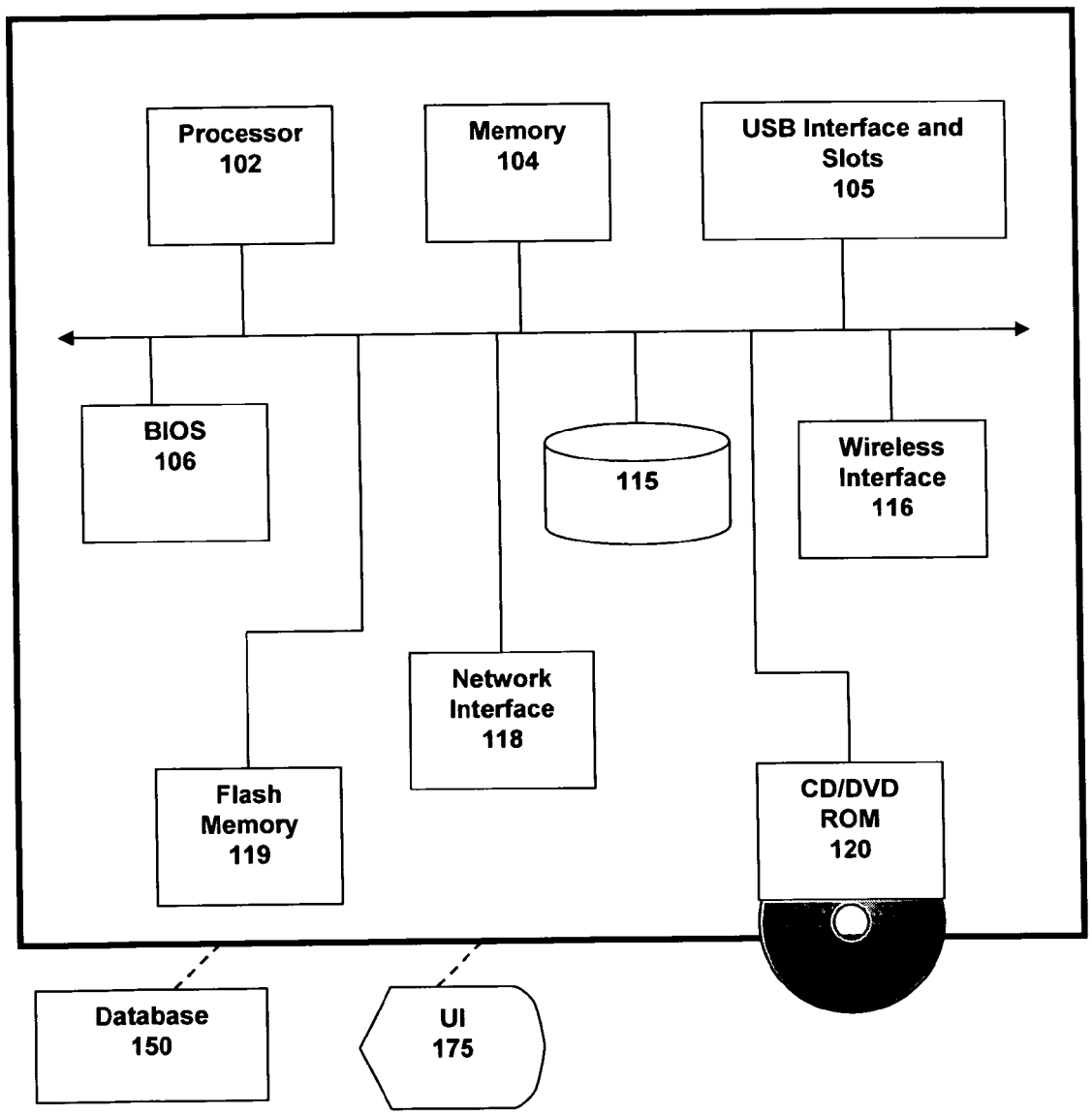
FIG. 1 is a high-level block diagram of a system configured to operate according to embodiments of the present invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

We describe an online method for rating an entity, using ratings provided by users (raters) of the rating method. The method is herein referred to as the GORB rating method. The GORB rating method provides built-in safeguards to boost the integrity of the rating process. Additionally, a novel system of allowing a community of raters to "rate" posted comments provides further verification of a rating. A rating, as discussed herein, is referred to as a "GORB" rating. GORB is an acronym for "Good or Bad."

The GORB method uses a unique identifier such as an email address for each user of the system. An email address makes for a good unique identifier for a few reasons: 1) people who use online rating systems already have email addresses; 2) although email addresses are very easy to acquire, each one is unique, unlike a proper name; and 3) in some respects an email address is more easily verifiable than a proper name. This is because email domains can be verified with known verification systems.

An entity is defined here as anyone or anything with an email address that can be rated. It may be an individual, a publication, a business. The entity is rated on both a perceived personal and a professional reputation. The method provides compensation for bias and time decay and uses an algorithm to determine the validity of a given rating. The method works well with a small volume of ratings, yet is easily scalable to large populations of raters.

Referring now in specific detail to the drawings, and particularly FIG. 1, there is shown a block diagram of an information handling system 100 configured to operate according to embodiments of the present invention. The system 100 comprises a processor 102, a memory 104, and an input/output (I/O) subsystem 106. The processor 102 may be a general or special purpose microprocessor operating under control of computer program instructions executed from a memory. The processor may include a number of special purpose sub-processors, each sub-processor for executing particular portions of the computer program instructions. Each sub-processor may be a separate circuit able to operate substantially in parallel with the other sub-processors. Some or all of the sub-processors may be implemented as computer program processes (software) that perform their respective functions when executed. These may share an instruction processor, such as a general purpose integrated circuit microprocessor, or each sub-processor may have its own microprocessor for executing instructions. Alternatively, some or all of the sub-processors may be implemented in an application-specific integrated circuit (ASIC). RAM (random-access memory) may be embodied in one or more memory chips.

The memory may be partitioned or otherwise mapped to reflect the boundaries of the various memory subcomponents.

The memory 104 represents either a random-access memory or mass storage. It can be volatile or non-volatile 119. A wireless interface 116, a CD/DVD ROM drive 120 and USB interface and slots 105 may be part of the system. The system 100 can also comprise a magnetic media mass storage device such as a hard disk drive 115. The I/O subsystem 106 may comprise various end user interfaces such as a display, a keyboard, and a mouse. A web browser user interface 175 is operatively connected to the system 100. The I/O subsystem 106 may further comprise a connection 118 to a network such as a local-area network (LAN) or wide-area network (WAN) such as the Internet. Processor and memory components are physically interconnected using conventional bus architecture. The system 100 is also operatively connected to a database 150 which may be a stand-alone database or installed on a host server and integrated with a web browser.

Figure 2:
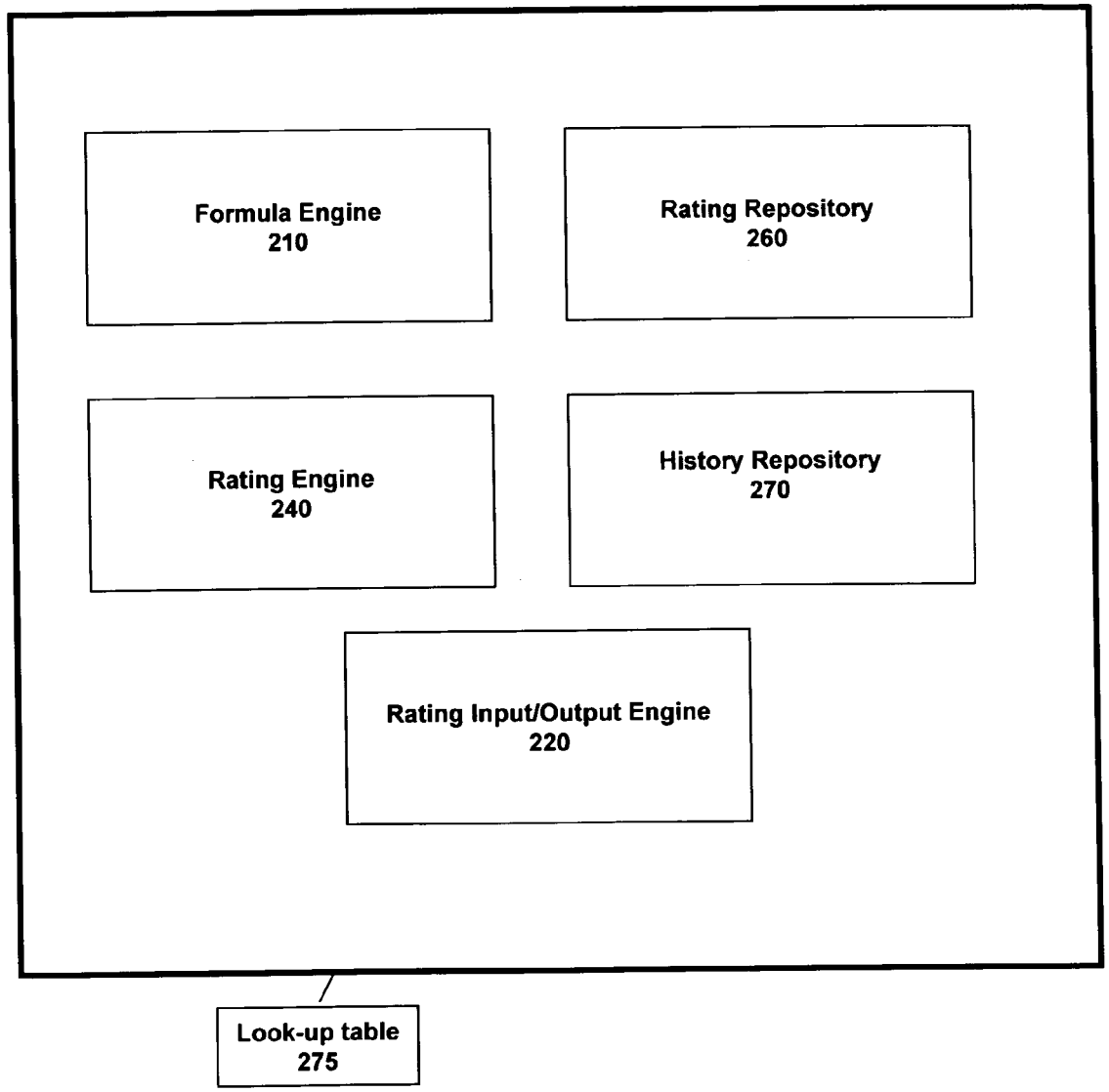
FIG. 2 is a high-level block diagram of the database of FIG. 1, according to an embodiment of the present invention.

Referring to FIG. 2 there is shown a simplified block diagram of the database 150 of FIG. 1. The database 150 contains a formula engine 210, a rating input/output engine 220, a rating engine 240, a rating/comment repository 260 and a history repository 270. Note that these are logical constructs, and are not necessarily separate machine components of the database 150. The rating input/output engine 220 is the user interface embodiment of the database 150. A standard lookup table 275 is used to access data from the repositories and engines.

Having described the main components of the GORB rating system 100, its operation will now be explained in detail in the discussion to follow, and in particular with respect to FIGS. 3 through 13, following a brief listing of proprietary terms and concepts.

GORB DEFINITIONS

Community GORB: the aggregated ratings of all raters who have rated an entity.

GORB Community: an entity's GORB community is the aggregation of the raters who have rated that entity.

GORB Notes: email notes sent anonymously.

GORB Stats: metrics calculated from data stored in the repositories.

Meta moderation: what the GORB community thinks of your comments.

Personal GORB rating: a rating based on what a rater thinks of an entity's personal qualities.

Professional GORB rating: a rating based on what a rater thinks of an entity's job-related qualities.

World GORB: the aggregation of all ratings in the GORB System.

Thumbs Up: an indication that a user agrees with a comment posted by another user.

Thumbs Down: an indication that a user does not agree with a comment posted by another user.

Tracking Panel: a vehicle for tracking the ratings and metrics of other entities in the system.

Opinion: what a rater thinks of a posted comment.

Opinion Balance: the difference between a Thumbs Up and a Thumbs Down.

Opinion Factor: the average of the favorable and unfavorable opinions.

GorB Algorithm Parameters.

The parameters residing in the formula engine 210 used to calculate the GORB algorithm, are as follows:

lbound, ubound: lower and upper bounds of a bounded GORB rating (in this example, 1 and 10, respectively);

INITGORB: the initial GORB rating automatically assigned by the method to an entity with no ratings—a real number between lbound and ubound;

INITCONFIDENCE: the reliability score of a person's initial GORB rating—the higher it is, the more ratings it takes to move an entity's GORB rating away from his/her INITGORB;

INITBIASCONFIDENCE: the reliability score of a person's initial bias assessment (the initial bias assessment is zero)—the higher it is the more ratings it takes to determine whether a person has systematic bias or not;

biasconfidence: the reliability score of a person's current bias assessment; this is initialized to INITBIASCONFIDENCE and is incremented every time a person's bias assessment is updated on the basis of more ratings;

Now: the current time

Time( ): a function that returns the timestamp of a previous rating.

DECAYSPEED: a factor that controls the rate of time decay of older ratings' confidence.

current: an entity's current bounded rating lcurrent: an unbounded rating that corresponds to an entity's current bounded rating gconfidence: a rater's reliability score currconfidence: the current rating's reliability score newconfidence: the new rating's updated reliability score lnew: an unbounded new rating computed from a current rating and a GORB rating new: a bounded new rating corresponding to an unbounded new rating lnew GORB rating: a bounded rating posted by a rater for an entity lgorb: an unbounded rating corresponding to a GORB rating:

ugorb: a bias-adjusted unbounded rating corresponding to an lgorb vscore: verification score GORB Algorithms.

Apply logit transform to convert from bounded gorb rating to unbounded (lgorb) rating:

$$y \leftarrow (gorb - lbound + \epsilon)/(ubound - lbound + 2\epsilon) lgorb = \log(y/(1-y))$$

Apply logit transform to convert from bounded current rating to unbounded (lcurrent) rating:

$$y \leftarrow (current - lbound + \epsilon)/(ubound - lbound + 2\epsilon)$$
$$lcurrent = \log(y/(1-y))$$

Compute bias-adjusted unbounded rating (ugorb) by subtracting rater's systematic bias estimate $$ugorb = lgorb - bias$$

Compute new unbounded rating (lnew) from unbounded current rating (lcurrent) and bias-adjusted unbounded (ugorb) rating:

$$lnew = \frac{gconfidence * ugorb + currconfidence * lcurrent}{gconfidence + currconfidence}$$

Compute reliability score for new unbounded rating:

$$newconfidence = gconfidence + currconfidence$$

Update rater's systematic bias estimate:

$$biasconfidence_{(new)} = biasconfidence_{(previous)} + currconfidence * decay$$

$$bias_{(new)} = \frac{biasconfidence_{(previous)} * bias_{(previous)} + currconfidence * decay * (lgorb - lcurrent)}{biasconfidence_{(new)}}$$

Compute new bounded rating (new) from new unbounded rating (lnew)

new=$l$bound+($u$bound−$l$bound+2$\epsilon$)*exp($l$new)/(1+exp($l$new))−$\epsilon$ GORB Overview.

Figure 12:
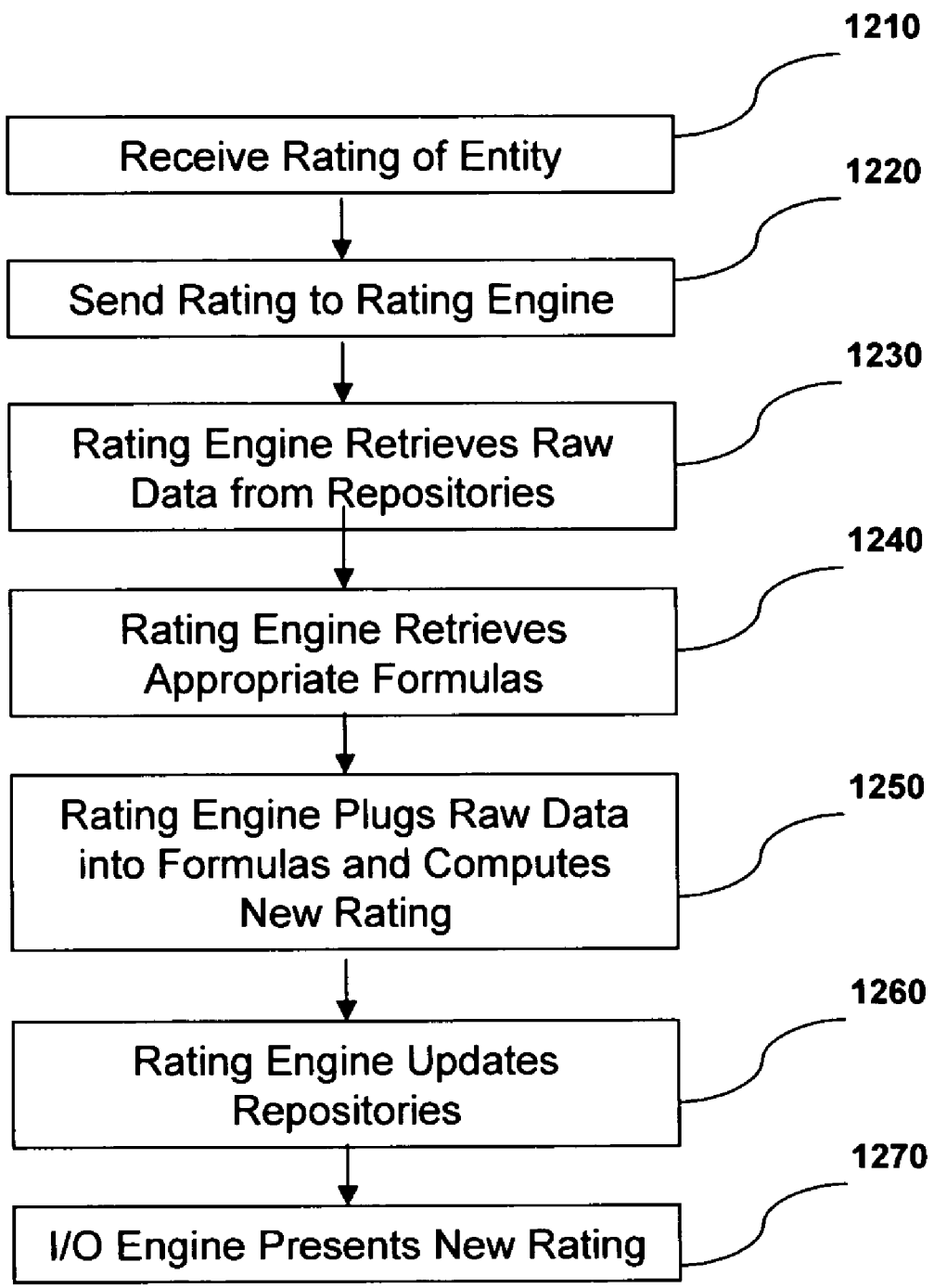
FIG. 12 is a flowchart of a general overview of the process for providing a rating, according to an embodiment of the present invention.

Referring to FIG. 12 there is shown a simplified flowchart of the GORB rating process for providing a rating of an entity, according to an embodiment of the invention. Note that this flowchart 1200 provides a general overview only. The process begins with the input/output engine 220. The input/output engine 220 receives as input user ratings and comments which are posted on-line. It presents as output GORB ratings and comments in response to a request.

The GORB system provides two levels of use: a basic user level and a registered user level. The first level is the basic level wherein an unregistered user is allowed to search for and view an entity's rating and/or post a rating of an entity. Additionally, the user can choose to post a comment, but no other functionality will be available to an unregistered user. At the registered user level, however, a user of the system can respond to comments, send anonymous e-mail notes, track the ratings of others, and promote his/her GORB rating. These features are some of the capabilities of the GORB system which will be covered in detail in the discussion of the GORB user interface.

Figure 14:
FIG. 14 is a screenshot of the GORB home page, according to the present invention.

Referring again to FIG. 12, the GORB rating system works on the email address as a key field. When the input/output engine 220 receives a rating in step 1210, it sends it to the rating engine 240 for processing in step 1220. The rating is a value within a bounded range (such as 1 through 10, inclusive) and a user is asked to rate an entity based on pre-defined criteria, selected by the system. The user provides a separate rating for each criterion. In this example, there are two criteria: personal (Personal GORB rating) and professional (Professional GORB rating). Also shown in FIG. 14 are arrow icons next to the GORB ratings. These icons indicate the trend of the entity's GORB rating, such as whether the ratings have increased or decreased since the last posting. If this is the first rating, the GORB algorithm computes the difference between the entity's INITGORB and the posted rating.

Once in receipt of a posted rating, the rating engine 240 will access the history repository 270 and the rating/comments repository 260 for raw data to enter into its computations in step 1230. The history repository 270 contains the rater's rating history and information about the rater and the entity to be rated. The rating/comments repository 260 contains any ratings and/or comments submitted by the rater. The rating/comments repository 260 contains all ratings in the system. The computations involve known mathematical formulas and GORB-specific algorithms, as will be discussed below. All formulas for computing the GORB rating algorithm are stored in the formula engine 210.

With the raw data retrieved from the repositories 260 and 270, the rating engine 240 will next need to access the formula engine 210 to retrieve the formulas to use. In step 1240 the rating engine 240 accesses the formula engine 210 to retrieve the appropriate formula(s) to use. New formulas may be added, as needed, in order to keep up with changing rating criteria. Existing formulas may be replaced as needed, with no down-time incurred. The replacement formulas are simply plugged in to the address of the existing formula. The system 100 uses a look-up table 275 known in the art to access the formulas; therefore, formulas can be replaced easily by switching them in the formula engine 210. The next time the relevant formula needs to be used, the system locates the address for the formula in the look-up table 275 and extracts the formula that is currently there. The look-up table 275 may reside within the database 150 or separately.

Next in step 1250 the rating engine 240 plugs the raw data extracted from the repositories 260 and 270 into the formulas and computes the new rating information. The rating engine 240 updates the repositories 260 and 270 with the new information it has computed in step 1260. The rating data is stored in the rating/comments repository 260 and the rater's e-mail address and other information about the rater is recorded in the history repository 270 in an effort to create a user's profile history. This profile history enables the user to update or override the rating previously provided by this user but not the ratings provided by other users. The history repository 270 and the rating repository 260 are cross-referenced on a key field which is preferably the user's email address. Note that this is a basic overview. Various computations that are part of the process have been intentionally left out in order to provide an overview. These computations will be discussed with respect to FIGS. 3 through 11 below.

Figure 18:
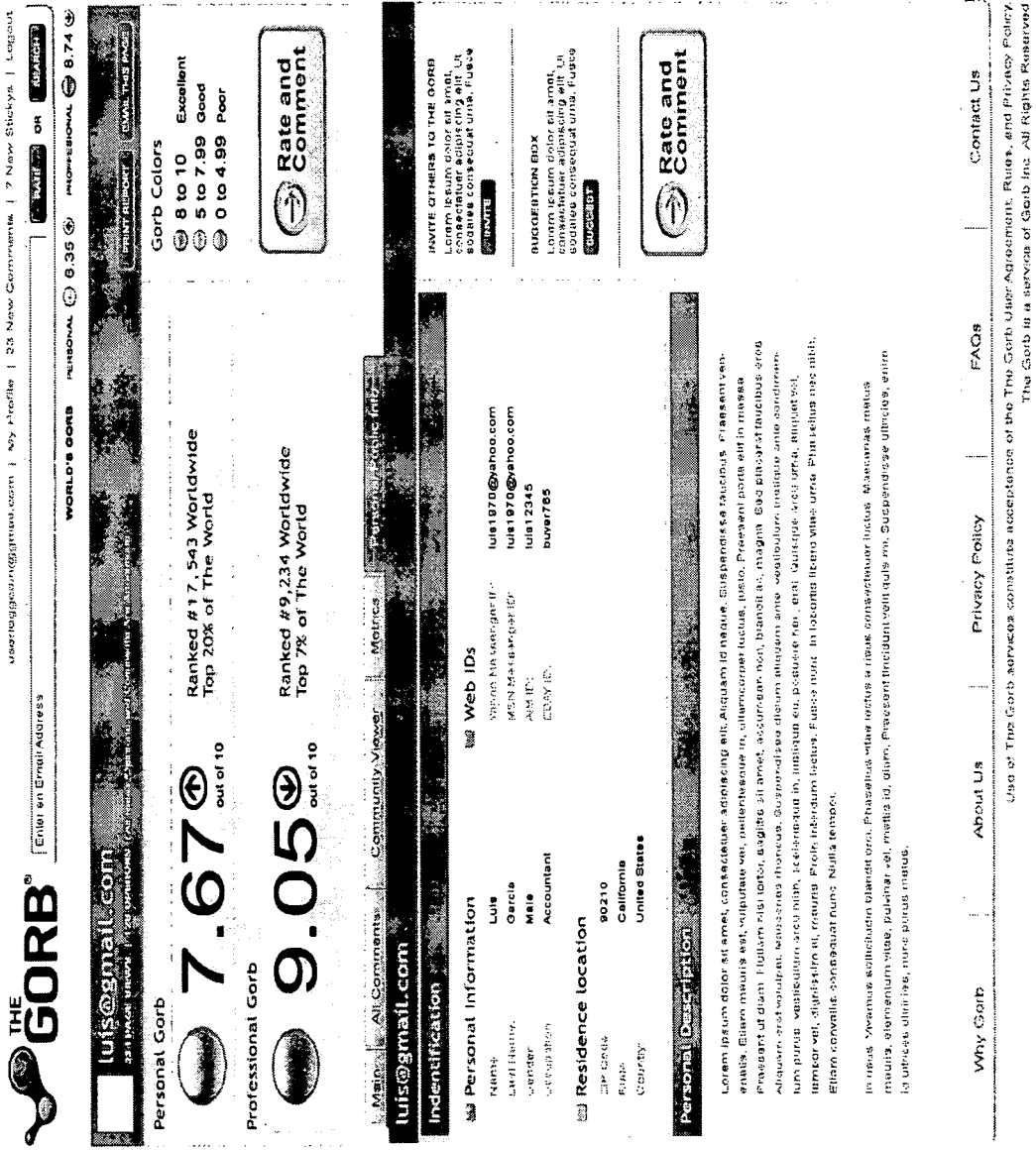
FIG. 18 is a screenshot of the profile personal information sub-page, according to the present invention.

After updating the repositories, the rating engine 240 then sends its calculated rating to the input/output engine 220. The input/output engine 220 outputs the new rating, the GORB rating, in step 1270 by posting it to the website. The newly calculated GORB rating is not made available to the public, however, until its reliability score (newconfidence) reaches a certain threshold. This threshold is inversely proportional to the entity's current GORB rating. In other words, the lower the entity's current GORB rating the higher the threshold reliability score that is required before the system makes this rating available to the public. The motivation for this feature is to protect people from malicious attempts to tarnish an entity's GORB rating. If the entity's GORB rating is at or above the threshold, the rating is viewable on the entity's profile page. See FIG. 18 showing a profile page. This page displays an entity's ratings and additional personal information optionally supplied by the entity. An entity's GORB rating may not meet the threshold if the entity has not acquired enough ratings. In such a situation, the system displays a descriptive message explaining that the rating has been taken into account but will only appear publicly once more ratings are posted.

Basic GORB Algorithm.

Figure 3:
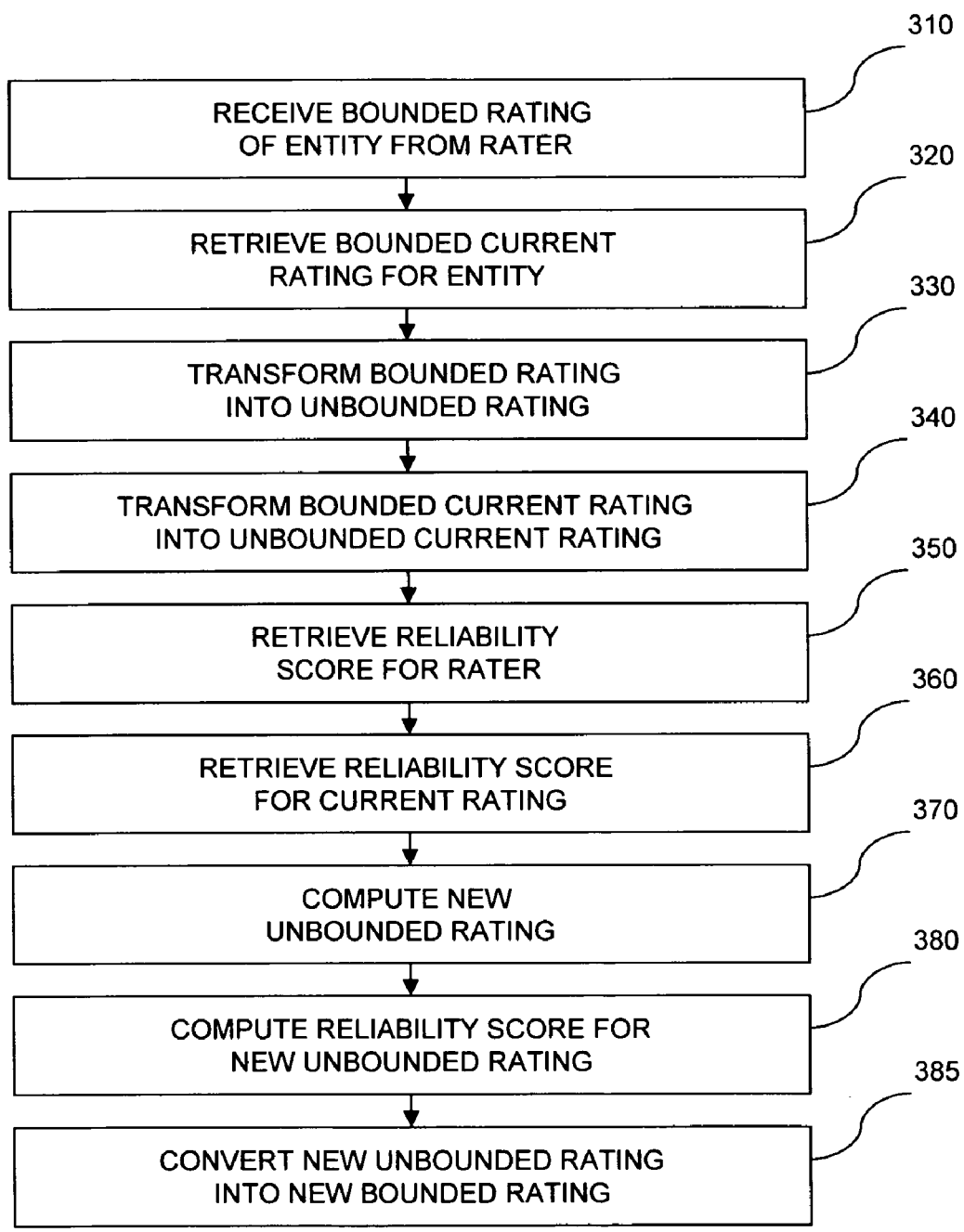
FIG. 3 is a flowchart of the basic algorithm for rating an entity, according to an embodiment of the invention.

Now we discuss the proprietary GORB algorithms used to compile the ratings. In FIG. 3 there is shown a flowchart illustrating an information processing method 300 for rating an entity, according to an embodiment of the invention. This is a more comprehensive flowchart than the general overview of FIG. 12. The rating process described with respect to FIG. 3 occurs every time a rating is posted to the system 100. The method begins at step 310 wherein a bounded rating of an entity, denoted by GORB rating, is received from a rater. The GORB rating is bounded in that the rating is a number falling within a bounded range. In this example, the bounded range is a set of integers with number one as the lower bound, and number ten as the upper bound. If the user selects a number other than an integer from one to ten, the user receives an error message and the user's entry is not accepted. If the user's rating entry is acceptable, it is stored in the history repository 270, along with other information about the user, such as the user's email address; and it is also stored in the rating repository 260. This bounded rating will be used to update the current bounded rating for the entity.

In step 320, a bounded current rating for the entity, denoted by current, is retrieved from the rating repository 260 in the database 150. If there is no current rating for that entity, then an initial rating is assigned to the entity and stored in the rating repository 260. As an example, an initial rating of eight may be assigned. The initial rating is equal to the value of parameter INITGORB. This initial rating will become the current bounded rating for the entity. Its reliability score will be equal to parameter INITCONFIDENCE. This initial rating will not carry less weight because it is in essence a default rating.

At this point in the processing the new bounded rating has been received from the rater and the current bounded rating of the entity current has been retrieved from the rating repository 260. Now in step 330 the new bounded GORB rating is transformed, by the rating engine 240, into an unbounded rating lgorb using a transformation algorithm, referred to as a logit transform. The logit transform transforms a variable x that is restricted to fall within [lbound, ubound] into a variable z that falls into the range ($-\infty$, $+\infty$). $\epsilon$ is a small positive real number (e.g. 0.05) that is used to avoid problems when x is equal to lbound or ubound:

$$y \leftarrow (x-lbound+\epsilon)/(ubound-lbound+2\epsilon) z=\log(y/(1-y))$$

In step 340, the bounded current rating current is transformed into an unbounded current rating lcurrent. The reason for this transformation is that the range or integers initially posted in a rating is very small (one to ten). Expanding the scale of the rating by removing the upper and lower bounds produces a more accurate rating. A reliability score gconfidence for the rater is extracted from the database 150 in step 350 and in step 360 the reliability score for the current rating currconfidence is extracted. A new unbounded rating lnew is computed in step 370, using the reliability scores gconfidence and currconfidence.

$$lnew = \frac{gconfidence * lgorb + currconfidence * lcurrent}{gconfidence + currconfidence}$$

In step 380 the reliability score for the new unbounded rating is computed by the rating engine 240 as follows:

newconfidence=gconfidence+currconfidence

This new reliability score newconfidence is stored in the database 150. In step 385 the new unbounded rating lnew is converted into a new bounded rating new for the entity, using the inverse of the logit transform, in order to avoid the problem of computations falling outside the legitimate interval of [lbound, ubound]. The inverse of the logit transform is as follows:

new=lbound+(ubound-lbound+2$\epsilon$)*exp(lnew)/(1+exp(lnew))-$\epsilon$

GORB Algorithm with Bias Compensation.

Figure 4:
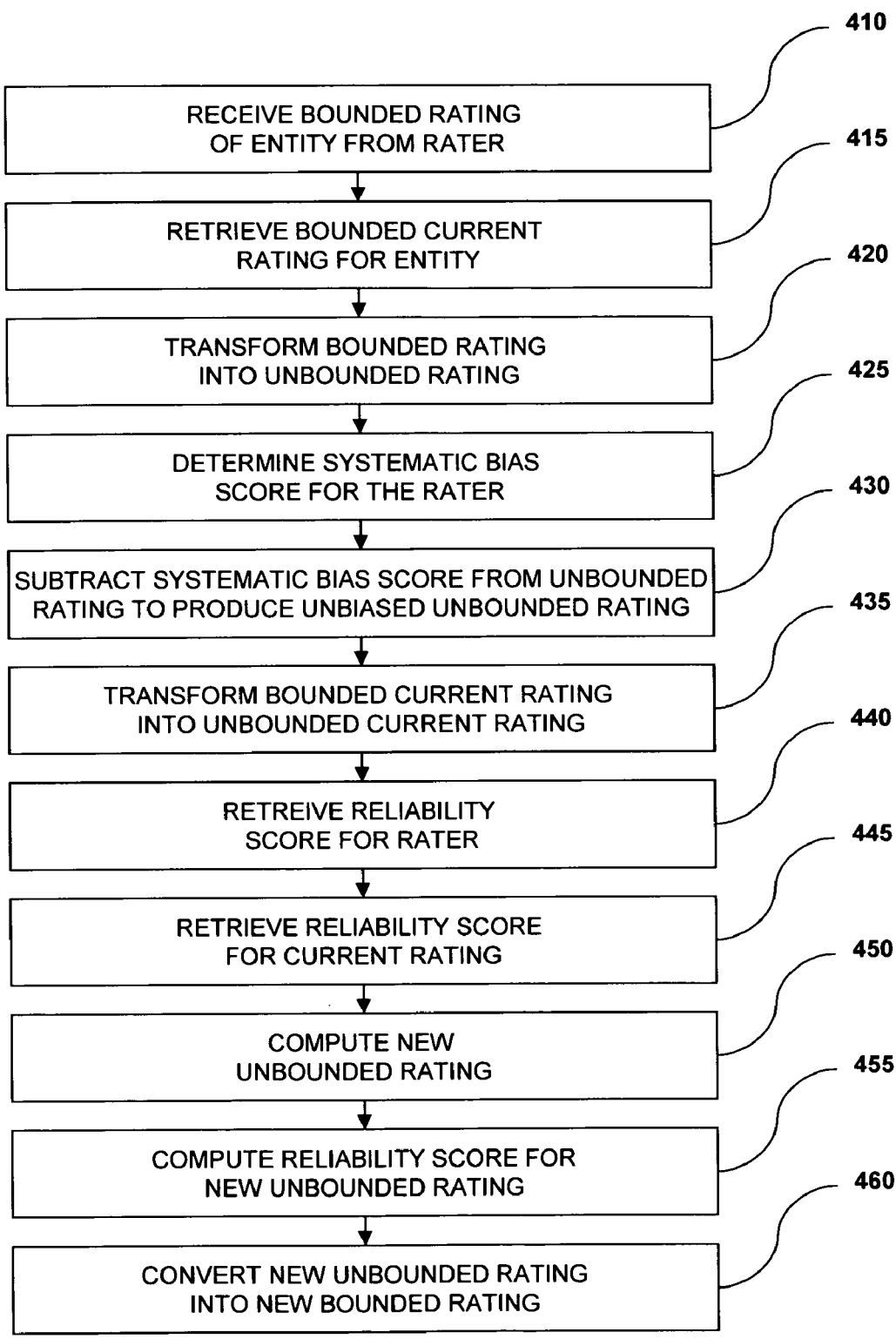
FIG. 4 is a flowchart of the basic algorithm with bias compensation, according to an embodiment of the invention.

FIG. 4 is a flowchart of the basic algorithm of FIG. 3, with the addition of bias compensation. Bias compensation is a way to assess the extent to which a rater provides accurate and unbiased assessments of other entities. An entity is not allowed to rate itself. The check for this is done on the email address entered by the entity. Bias is different from honesty. A rater can be honest in his/her rating, but still be inaccurate or biased due to poor ability to judge, lack of information, or subconscious issues. A rater's estimated bias is a function of the distance d between a rater's ratings for a subset of entities that the rater has rated and the average of other people's ratings for the same entities. The subset is selected from a group of ratings posted by other raters for that entity within a specified period of time. The period of time is selected based on user-defined factors, such as how long the entity has been in the system (from the history repository 270) and the frequency of ratings posted for the entity (from the rating repository 260). The user-defined factors may change as the situation warrants. The subset may encompass all ratings posted for this entity, especially if the entity has only been in the system for a short period of time.

If the rater is unbiased then this average should be close to zero. The algorithm for bias compensation updates a rater's systematic bias estimate each time the rater posts a new rating and subtracts the bias estimate from the rater's current unbounded rating. The computation for systematic bias will be discussed with respect to FIG. 9.

The process begins at step 410 when a bounded rating of an entity is received from a rater through the input/output engine 220. The rating may be received through different means, such as online posting and via SMS (Short Message Service). Then in step 415 the bounded current rating for the entity is retrieved from the rating repository 260 in the database 150. If there is no current rating for the entity, a rating is assigned and stored in the rating repository 260. In step 420 the bounded rating is transformed into an unbounded rating.

In step 425 a systematic bias score for the rater is determined based on calculations performed by the rating engine 240. A systematic bias score for a new rater y is calculated as follows:

Initialization: the following steps are performed before rater y posts his first rating:

bias=0 biasconfidence=INITBIASCONFIDENCE

Update: Upon receipt of a rating from rater y for entity x the systematic bias estimate of rater y is updated as follows:

$$biasconfidence_{(new)} = biasconfidence_{(previous)} + currconfidence * decay$$

$$bias_{(new)} = \frac{biasconfidence_{(previous)} * bias_{(previous)} + currconfidence * decay * (lgorb - lcurrent)}{biasconfidence_{(new)}}$$

Decay will be discussed with respect to FIG. 5.

In step 430 the systematic bias score bias is subtracted from the unbounded rating lgorb in order to produce the unbiased unbounded rating ugorb:

ugorb=lgorb-bias

In step 435 the bounded current rating is transformed into an unbounded current rating using a transformation algorithm. In step 440 the reliability score for the rater is retrieved from the database 150 and in step 445 the reliability score for the current rating is retrieved from the database 150. In step 450 a new unbounded rating is computed according to the formula:

$$lnew = \frac{gconfidence * ugorb + currconfidence * lcurrent}{gconfidence + currconfidence}$$

and in step 455 a reliability score for the new unbounded rating is computed. In step 460 the new unbounded rating is converted into a new bounded rating.

GORB Algorithm with Time Decay.

Figure 5:
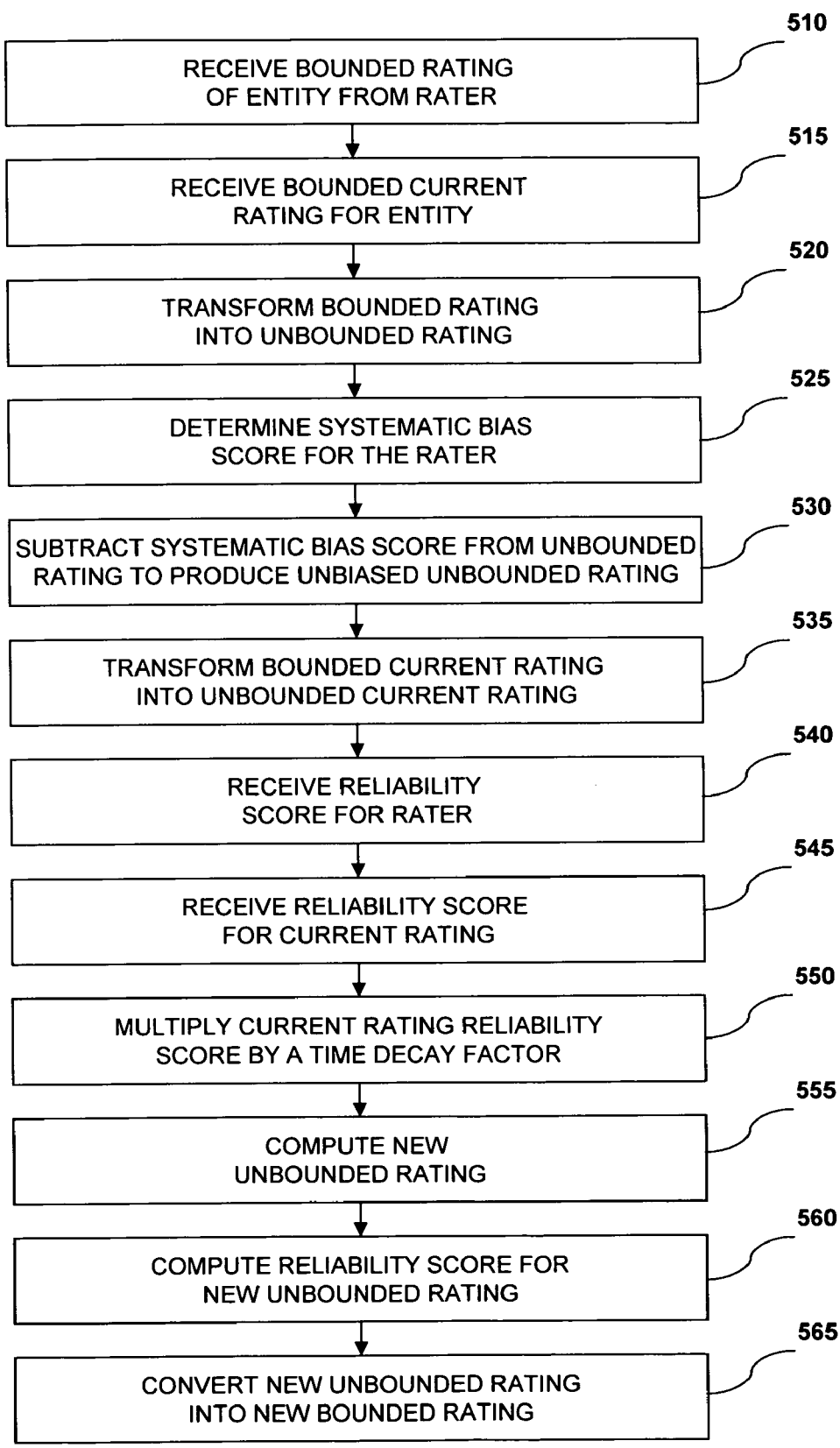
FIG. 5 is a flowchart of the basic algorithm with time decay, according to an embodiment of the invention.

Referring to FIG. 5 there is shown a flowchart of the algorithm of FIG. 3, with the addition of a factor for time decay, according to an embodiment of the present invention. The objective of introducing a measure for time decay is to compensate for ratings posted in the distant past. It is to be assumed that people may change over time; therefore the weight of ratings posted a long time ago should decay to make room for newer ratings that presumably reflect more recent "measurements" of an entity's reputation, reliability, and so on. Time decay of older ratings is implemented in the algorithm by multiplying the reliability score of the current unbounded rating by a decay factor. The decay factor is currently calculated by:

decay=exp[−(Now−Time(previous))/DECAYSPEED]

where Now is the current time, Time(previous) is the submission time of the previous rating for entity x and DECAYSPEED is an algorithm parameter that determines how fast older ratings lose their importance. This decay factor is used in the computation of the new unbounded rating and the new rating's reliability score according to the formulae:

$$lnew = \frac{gconfidence * lgorb + decay * currconfidence * lcurrent}{gconfidence + decay * currconfidence}$$

$$newconfidence = gconfidence + decay * currconfidence$$

Determining a Probabilistic Forecast.

Figure 7:
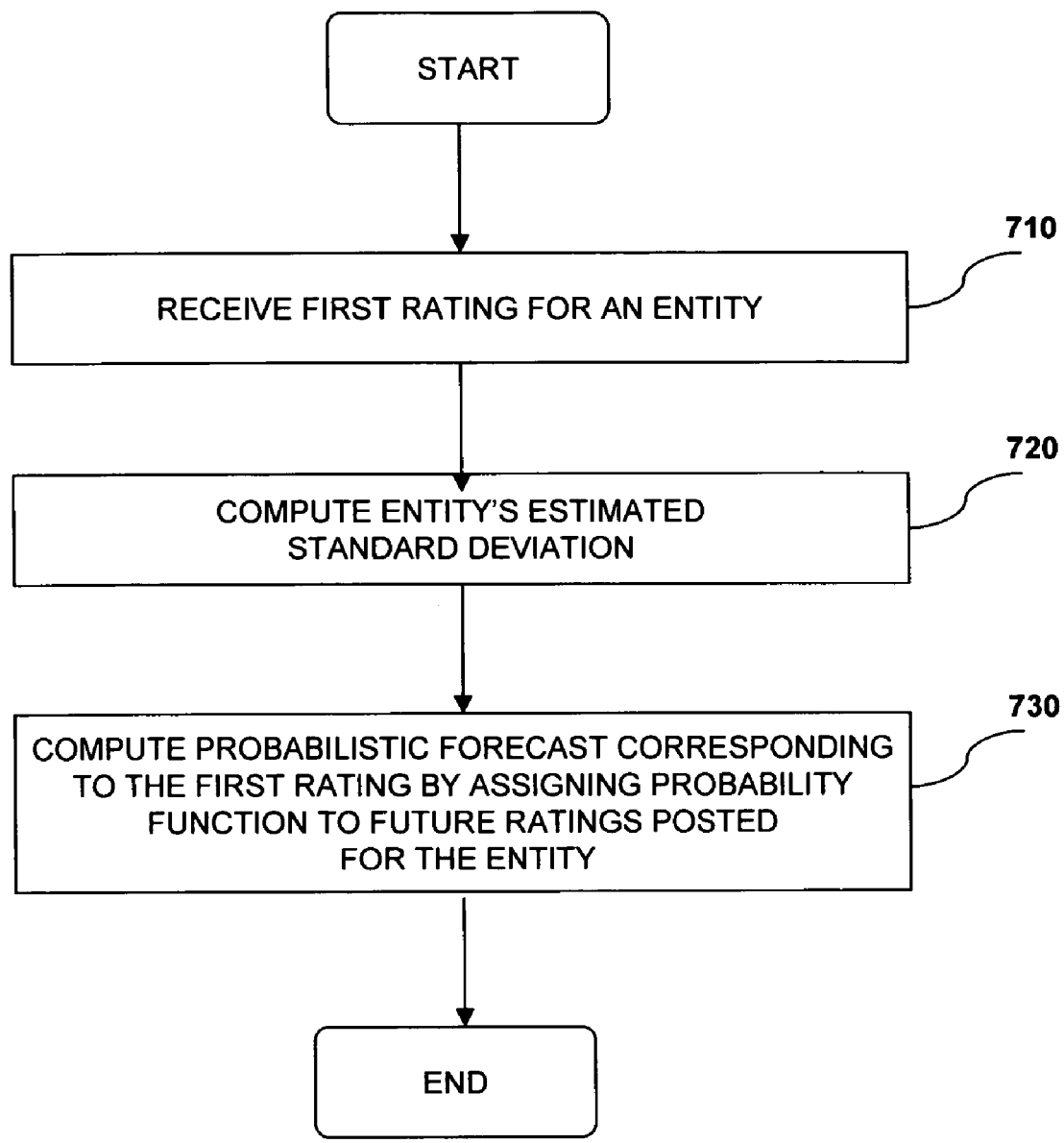
FIG. 7 is a flowchart of a method for converting the first rating of FIG. 4 into a probabilistic score, according to an embodiment of the invention.

Referring now to FIG. 7 there is shown a flowchart for converting a rating y received from a first rater of an entity x into a probabilistic forecast of future ratings y for that entity x. The process begins at step 710 by receiving a first rating y of an entity x. Next in step 720 the standard deviation of a subset S of recent ratings posted for that entity x is computed on the basis of the standard statistical formulae:

$$\sigma = \sqrt{\frac{1}{|S|-1}\sum_{i \in S}(x_i - \bar{x})^2}, \quad \bar{x} = \frac{1}{|S|}\sum_{i \in S}x_i$$

Where |S|=number of elements of set S

Then in step 730 the probabilistic forecast corresponding to the first rating is computed by assigning a probability function $f(y|x)$ to future ratings posted for the entity x, such that the mean of the function is equal to the current rating y and the standard deviation of the function is equal to σ. For example, the probability function can be a normal probability density, defined as:

$$f(y|x) = \exp(-(y-x)^2/2\sigma^2)/(\sqrt{2\pi}\sigma)$$

Identifying and Eliminating Systematic Bias.

Figure 9:
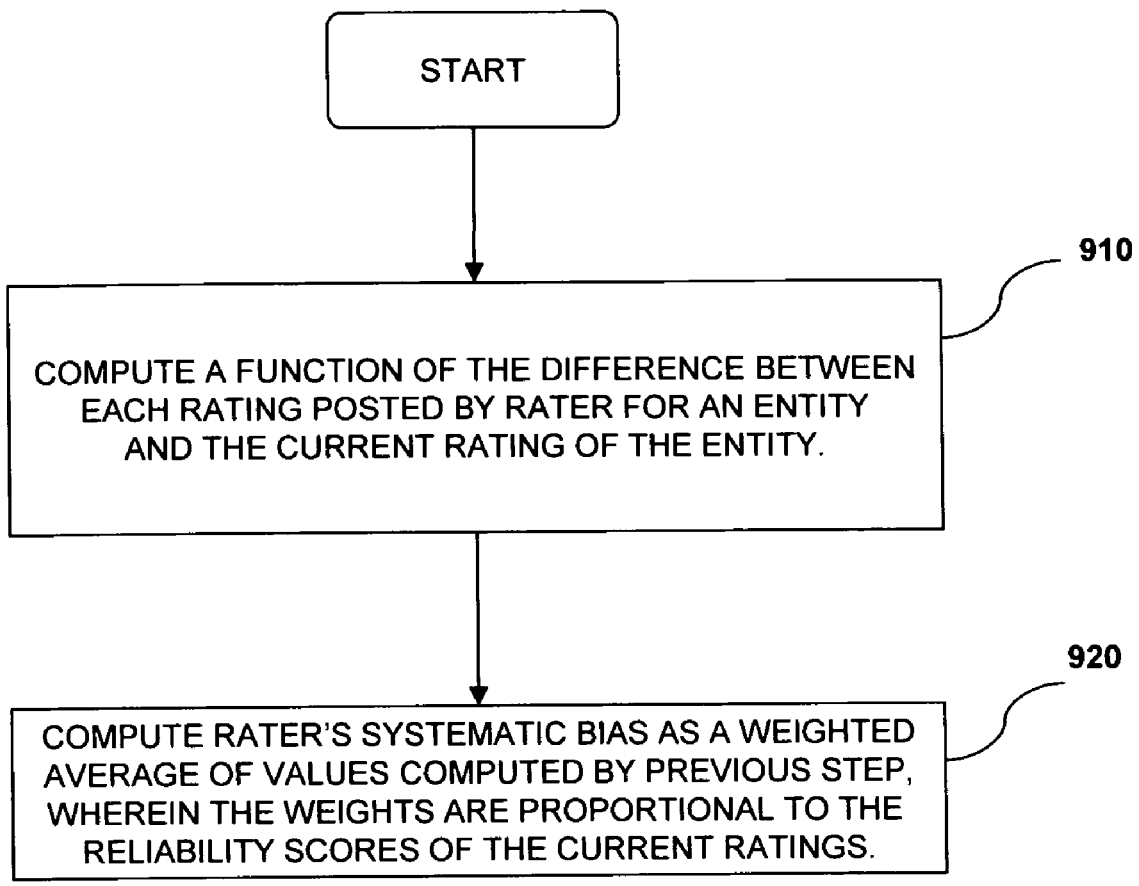
FIG. 9 is a flowchart of a method for computing a rater's systematic bias, according to an embodiment of the invention.

In order to eliminate bias from a rating, a rater's systematic bias must be calculated, as shown in FIG. 9. The process for calculating a rater R's systematic bias begins at step 910 by computing a function of the difference between each rating y posted by R for an entity x and the current rating of entity x. The difference is actually a comparison between what R thinks of x and what the current rating of x is since the current rating is an aggregate of all posted ratings for x. Once the difference between each rating posted by R and the current rating is computed, the process concludes at step 920 by computing the rater R's systematic bias as a weighted average of the values computed in step 910, wherein the weights are proportional to the reliability scores of the current ratings. These steps are performed for every rating received and are a key aspect of the GORB algorithm for the elimination of systematic bias in the rating system.

Computing a Rater Reliability Score.

Figure 6:
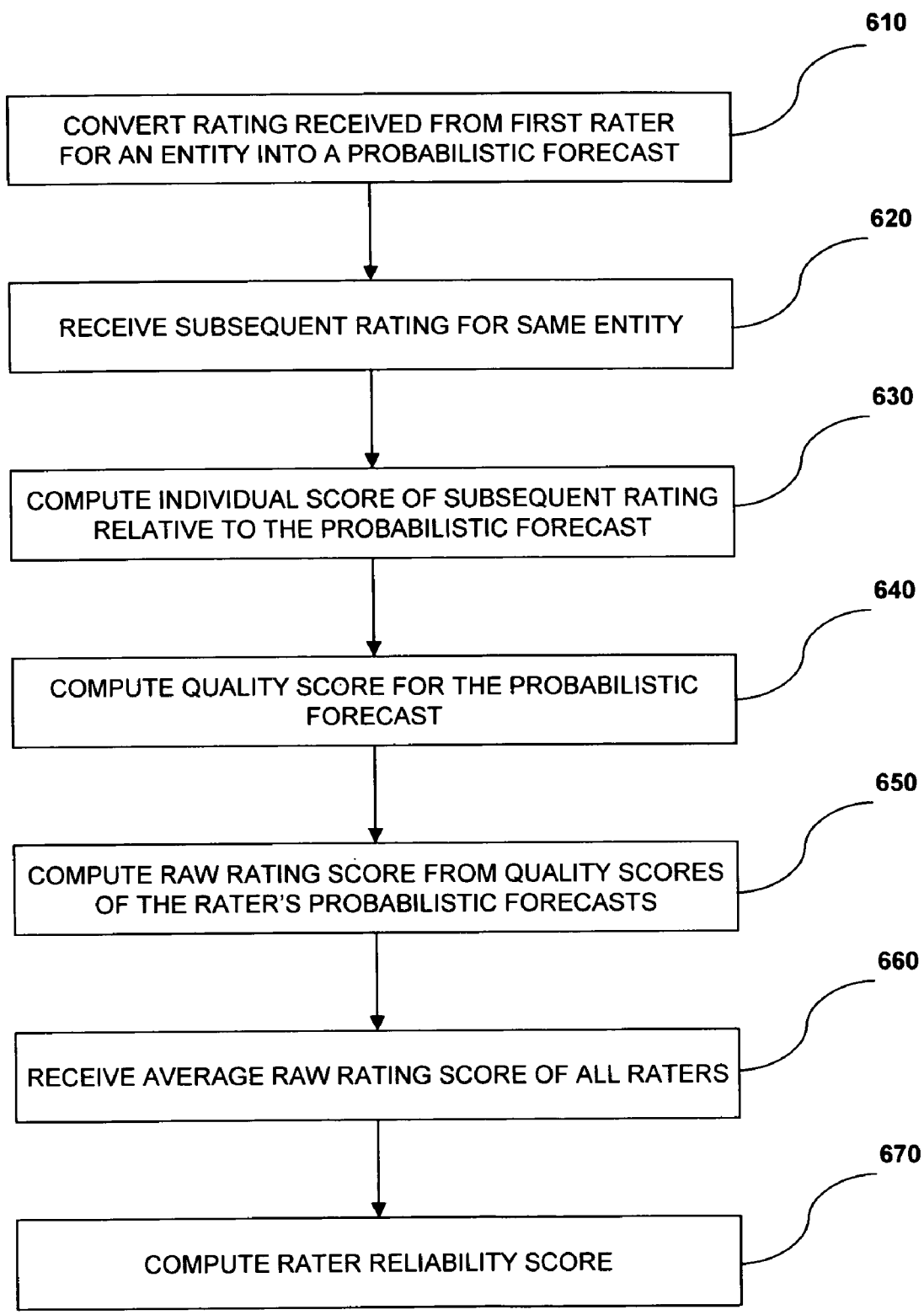
FIG. 6 is a flowchart of a method for computing rater reliability, according to an embodiment of the invention.

Referring now to FIG. 6 we discuss how a rater's reliability score is calculated. The process begins at step 610 by converting a rating y received from a first rater for an entity x into a probabilistic forecast. When a subsequent rating is received for that same entity in step 620, the individual score of that subsequent rating relative to the probabilistic forecast associated with rating y is computed in step 630. The individual score is partially computed using a proper scoring rule, which is a standard statistical method for evaluating the quality of probabilistic forecasts. [See "Strictly Proper Scoring Rules, Prediction, and Estimation," Tilmann Gneiting and Adrian E. Raftery, Technical Report no. 463R, Department of Statistics, University of Washington, November 2005.] Next in step 640 a quality score for the probabilistic forecast associated with a rating is computed by combining the individual scores of a number of ratings posted by other raters for entity x (subsequent to rating y).

Step 650 proceeds by computing the raw rating score from the quality scores of all probabilistic forecasts associated with a rater's ratings. In step 660 the average raw rating score of all raters is retrieved from the database 150 and is used to compute a rater reliability score in step 670. For example, the rater reliability score can be based on the ratio of a rater's raw rating score to the average raw rating score of all raters.

Figure 8:
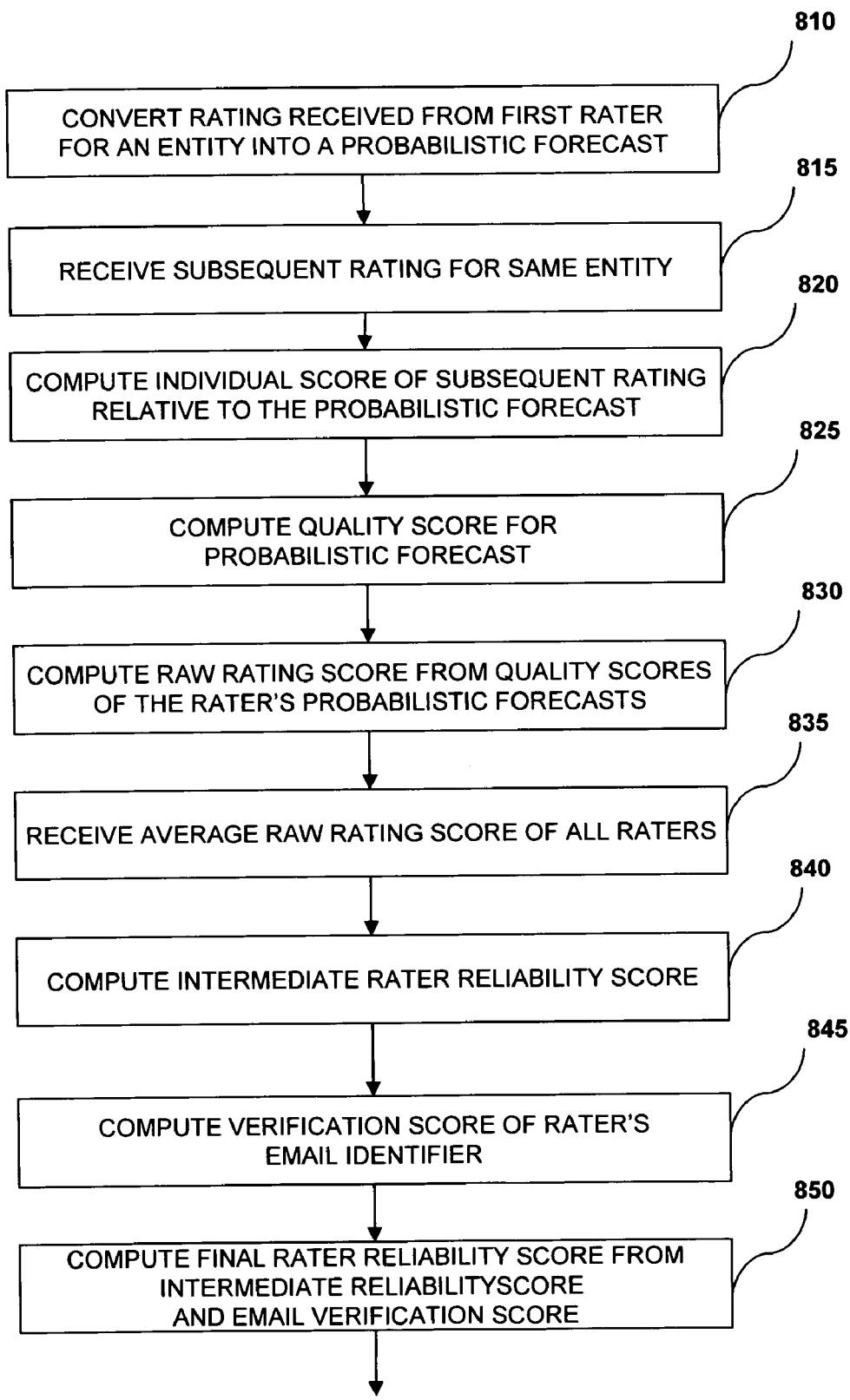
FIG. 8 is a flowchart of a method for computing rater reliability that includes calculation of a verification score associated with the rater's email identifier for the purpose of anti-SPAM checking, according to an embodiment of the invention.

Computing a Reliability Score that Includes an Email Address Verification Factor Referring now to FIG. 8 we discuss how the verification score is implemented within the process for calculating a rater's reliability score. The process begins at step 810 by converting a rating y received from a first rater for an entity x into a probabilistic forecast. When a subsequent rating is received for that same entity in step 815, the individual score of that subsequent rating relative to the probabilistic forecast associated with rating y is computed in step 820. The individual score is partially computed using a proper scoring rule. Next in step 825 a quality score for the probabilistic forecast associated with a rating is computed by combining the individual scores of a number of ratings posted by other raters for entity x (subsequent to rating y).

Step 830 proceeds by computing the raw rating score from the quality scores of all probabilistic forecasts associated with a rater's ratings. In step 835 the average raw rating score of all raters is retrieved from the database 150 and is used to compute an intermediate rater reliability score in step 840. In step 845 a verification score associated with the rater's email is computed. In step 850 the final rater reliability score is computed by combining the intermediate rater reliability score and the verification score associated with the rater's email. For example, the two scores can be combined by multiplying them.

Computing an Email Address Verification Factor.

Figure 10:
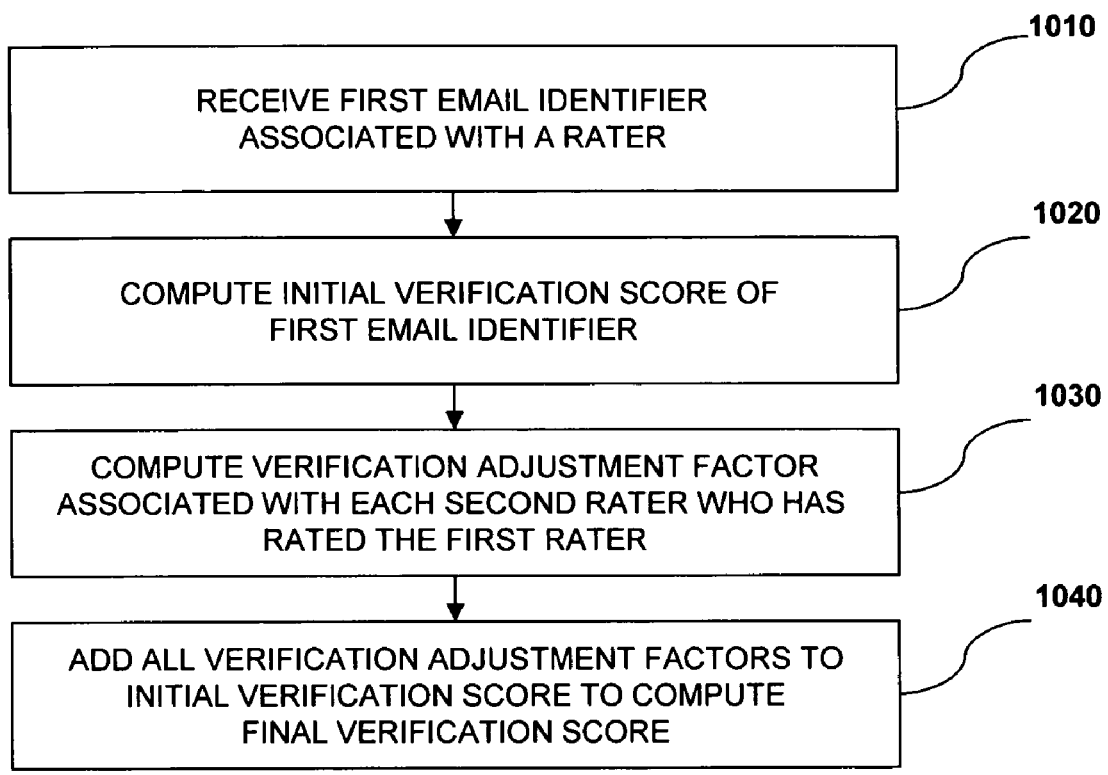
FIG. 10 is a flowchart of a method for computing a verification score associated with an email identifier for the purposes of anti-SPAM checking, according to an embodiment of the invention.
Figure 11:
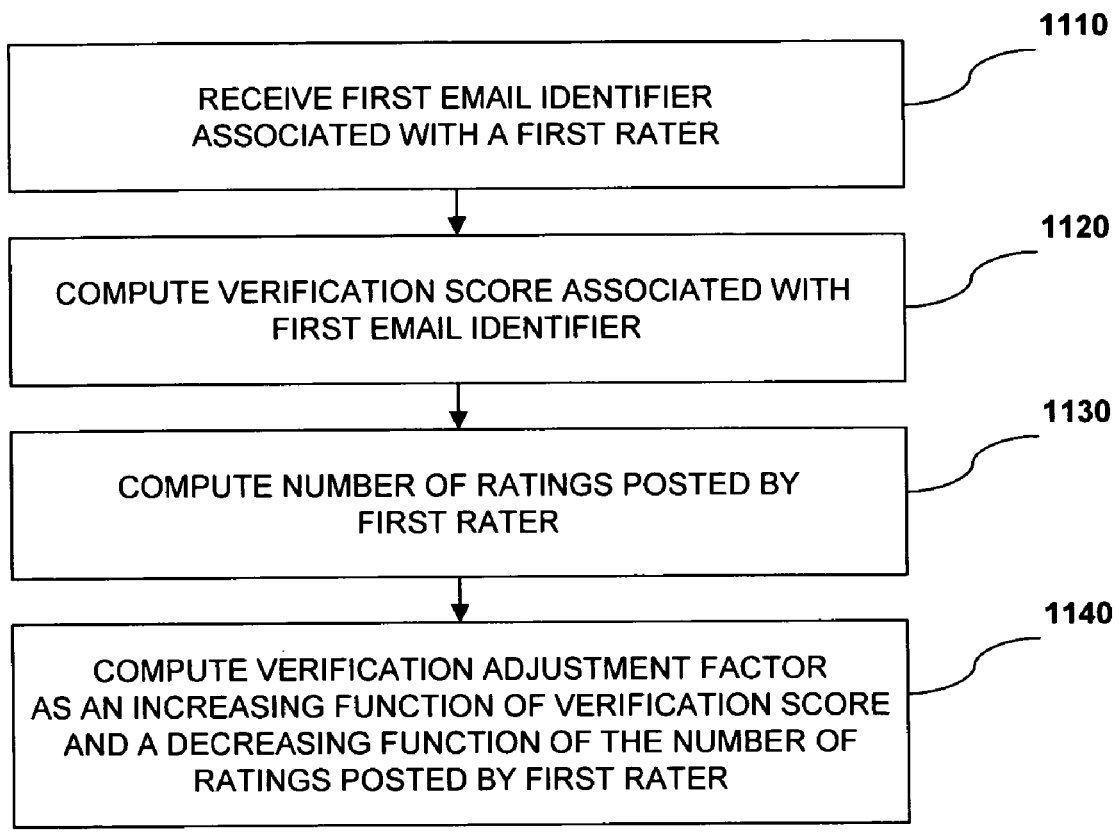
FIG. 11 is a flowchart of a method for computing a verification adjustment factor associated with an email identifier for the purposes of anti-SPAM checking, according to an embodiment of the invention.

Raters must provide an email identifier when using the system. It is important to verify the validity of this email identifier. People may create fake email "personas" for the purpose of rating themselves or giving others an undeserved rating. Referring now to FIGS. 10 and 11 there are shown flowcharts of the steps for addressing this issue.

Referring now to FIG. 11, we discuss the process for determining the validity of an email identifier by taking into account both the domain name associated with the identifier and the number of ratings posted by other raters for the entity identified by the email identifier. The process begins at step 1110 with the receipt of a first email identifier e associated with a first rater. Next in step 1120, a verification score associated with e will be computed and maintained. In fact, the verification score for every rater, together with all of the rater's other information will be maintained in the database 150.

In step 1130 the number of ratings posted by the first rater is added. Finally, in step 1140, the verification score computed in step 1120 is multiplicatively applied to the weight of each rating submitted by that rater. The formula to determine this verification score is:

$$vscore(e) = v0(e) + \sum_{r|r \in R} v1(vscore(e_r), Nratedby(e_r))$$

where v0(e) is the initial verification score of email identifier e v1(vscore, Nratedby) is a verification adjustment factor. A verification adjustment factor is an increasing function of an email identifier's verification score v and a decreasing function of the number of ratings N posted by that identifier.

Nratedby(e) is a function that returns the number of entities that have been rated by the rater associated with identifier e.

R is the set of raters who have posted a rating for the person associated with identifier e.

Referring to FIG. 10 there is shown a flowchart for computing the rater verification score described above. The process begins at step 1010 upon receipt of a first email identifier e associated with a rater. In step 1020 the process proceeds by computing an initial verification score for e. The initial verification score is a function of the email identifier's domain and it is a decreasing function of the ease with which a random individual can obtain an email address from the email address provider organization. For example, the initial verification score of free email addresses provided by Internet portals such as Yahoo!®, MSN Hotmail, GMail™ and the like will be low because any individual can easily create a large number of email identifiers under these domains. On the other hand, the initial verification score of email addresses associated with reputable employers who have strict policies on issuing email addresses (e.g. only issue email addresses to employees and promptly de-activate them once employees leave) will be higher. The computation of initial verification scores relies on known email domain name verification systems and industry intelligence on the degree of authentication associated with a given domain. Known email domain name verifications systems such as TowerData and Hexillion can verify that a domain name is legitimate and that the email name provided is currently registered with that domain.

Next, in step 1030 a verification adjustment factor associated with each additional rater who has rated the first rater is computed and in step 1040 all verification adjustment factors are added to the initial verification score to compute a final verification score. The verification adjustment factor associated with an additional rater y who has rated the first rater x is a function of rater y's verification score and of the number of entities that rater y has rated so far, wherein this function is an increasing function of rater y's verification score and a decreasing function of the number of entities that rater y has rated so far.

The logic supporting the above process is that an email identifier is less likely to be SPAM email if it is issued by a reputable provider who has strict procedures for issuing email identifiers, or if it has been rated by a large number of other reputable identifiers. To increase the difficulty of using a single reputable identifier to validate large numbers of SPAM email identifiers, the contribution of a rating from a reputable identifier to increasing the verification score of another identifier is a decreasing function of the total number of entities rated by the reputable identifier.

Periodic Recalculation of Estimates.

The recursive updating equation lends itself well to a high-volume, online environment. On the other hand, the weight of each rating is based on information available to the system about the rater at the time of each rating. As the system accumulates more ratings, it might come to substantially revised conclusions regarding a rater's reliability, honesty, bias, etc. These conclusions should ideally lead to a revision of the weight of that rater's past ratings. This revision will change the GORB rating of each entity rated by the rater. Changed GORB ratings will affect the system's assessment of the reliability, honesty, etc. of other raters who have rated those entities (because these assessments are based on functions of each rater's ratings relative to the person's GORB rating at that time; if the GORB rating changes, the assessments change as well). The process may lead to a chain reaction that will update all entities' GORB rating and reliability estimates.

The periodic recalculation should be performed on a user-determined schedule (bi-monthly, semi-annually, annually). As the database 150 content increases, the recalculation will take longer and longer, therefore it should preferably be performed as an off-line process.

GORB Rating System User Interface.

When any user first accesses the GORB on-line rating system by entering a URL in a web browser address bar, he/she will see the home page of the GORB system as shown in FIG. 14. Prominently featured on the home page is a text field where a user can enter an email address. Next to this field are two buttons marked "Rate" and "Search." A user (at either level) can select to search for an entity to view the entity's GORB rating, or the user can select to post a rating for that entity. In the upper right-hand corner of the screen there are fields for Login and Register functionality. The home page also features the current World GORB rating, updated in real-time. This is the current up-to-the-minute aggregate average of all GORB ratings for all GORB users. In this example it is further broken down into a personal World GORB rating and a professional World GORB rating.

Next to the GORB ratings are icons to indicate the current trend for the ratings. In this example the icons shown are arrows, but any other symbol indicative of direction may be used. An "up" arrow indicates that the rating has increased and the "down" arrow indicates that the rating has decreased since the last posted rating. If the rating stayed the same or this is the first rating, an "up" arrow is used. The World GORB ratings can be viewed as a barometer of the GORB community's general feelings of satisfaction or discontent, much the same way that the stock market index mirrors the financial community's level of optimism.

Figure 15:
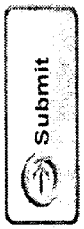
FIG. 15 is a screenshot of the GORB rating page, according to the present invention.

From the home page shown in FIG. 14, assume a user has entered an email address of an entity which is not in the system (has not been rated). The GORB system will inform the user that the entity is not in the system (has not been rated yet) and then invite the user to rate the entity by forwarding the user to the rating page as shown in FIG. 15. On this page a user is presented with a selection of rating categories. In this example, there are two categories: Personal Conduct and Professional Conduct. Each category has a rating bar with a bounded interval of numbers. The user simply moves the tab on the rating bar to the desired number. Optionally, a user can add a comment in the comment field, but this is not mandatory. In order to provide a rating, the user must enter his/her valid email address. The user posts the rating by selecting the SUBMIT button on the bottom of the page. Before accepting the submitted rating, the user's e-mail address needs to be verified. This is done by sending a verification e-mail to the submitted e-mail address. Only after receiving an acknowledgment to the verification e-mail does the submitted rating get processed. The user can change the rating as many times as he/she wants prior to submitting the rating. Once the rating is submitted, however, it cannot be changed, but it can be deleted at any time.

Figure 16:
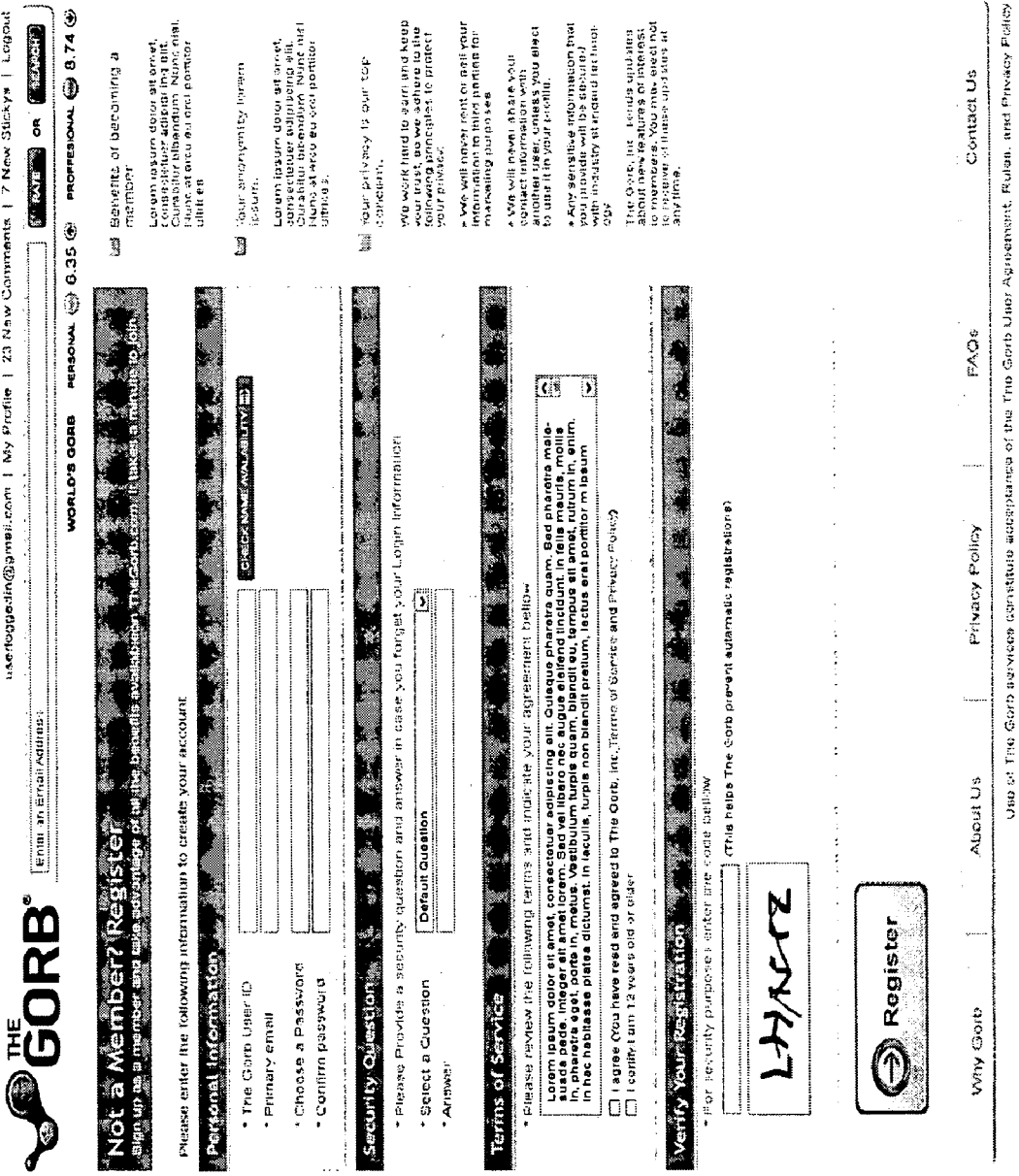
FIG. 16 is a screenshot of the GORB register page, according to the present invention.
Figure 17:
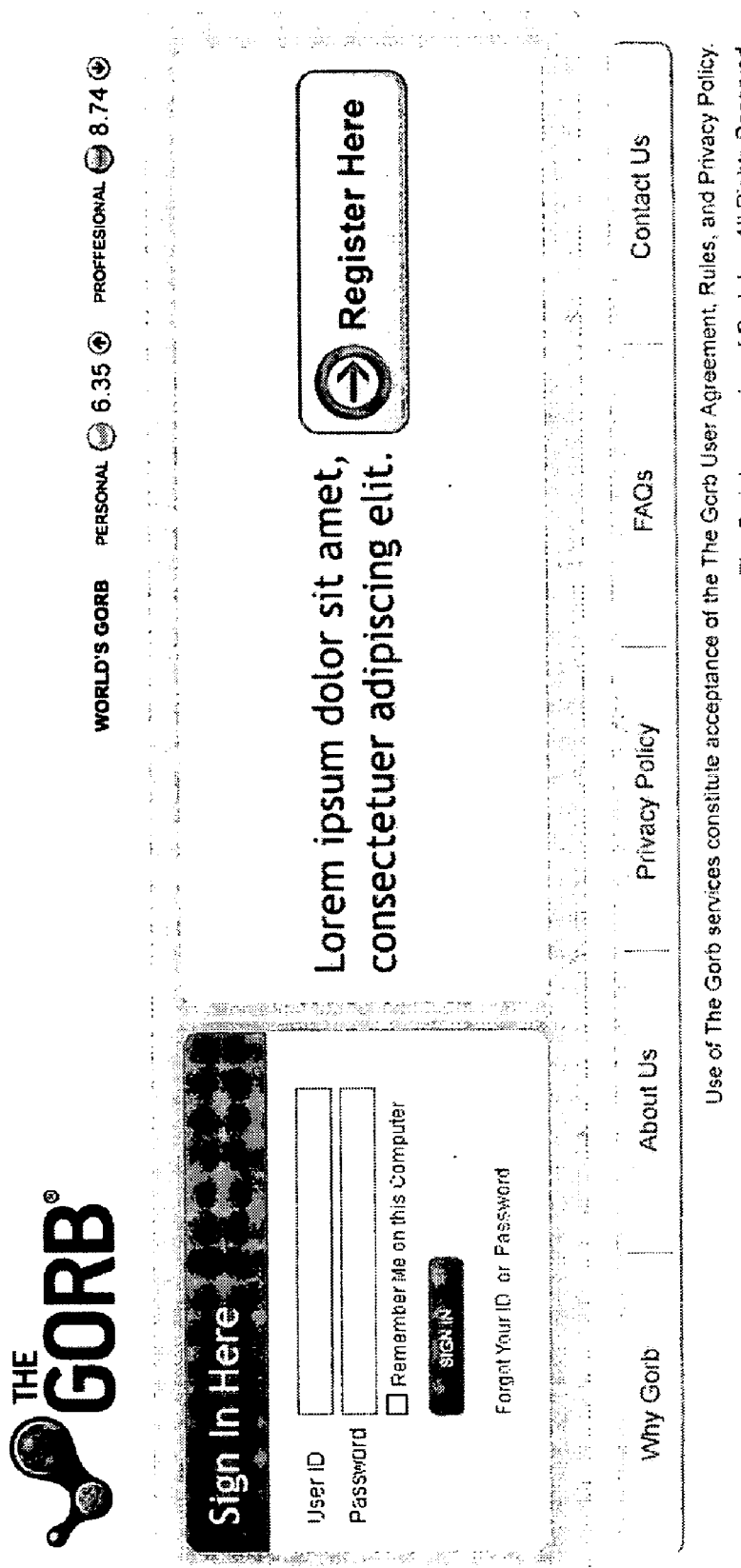
FIG. 17 is a screenshot of the GORB login page, according to the present invention.

If the user now wishes to become a registered user with the additional features that this enables, the user can register at the register screen shown in FIG. 16. Once registered, the user can partake of the additional features by logging into the system at a login screen, shown in FIG. 17.

To provide better visual clarification of a rating, the GORB system 100 provides visual indicators indicating in what range the rating falls. This visual indicator, which may be a color, is displayed in close proximity to the numerical rating. The visual indicators can be any easily detectable icon which is easily distinguishable. Assume that color-coding is used as the visual indicator. Three color levels would indicate whether a rating is considered "Above Average," "Average," or "Poor," similar to a grading system. As an example, a rating of 8.0 and above may be considered "Above Average" and is therefore denoted by the color associated with "Above Average." A rating of 6.5 to 7.9 may be considered "Average" and is presented along with the color associated with "Average." A rating below 6.5 may be considered "Poor" and is displayed with the color associated with "Poor."

Figure 25:
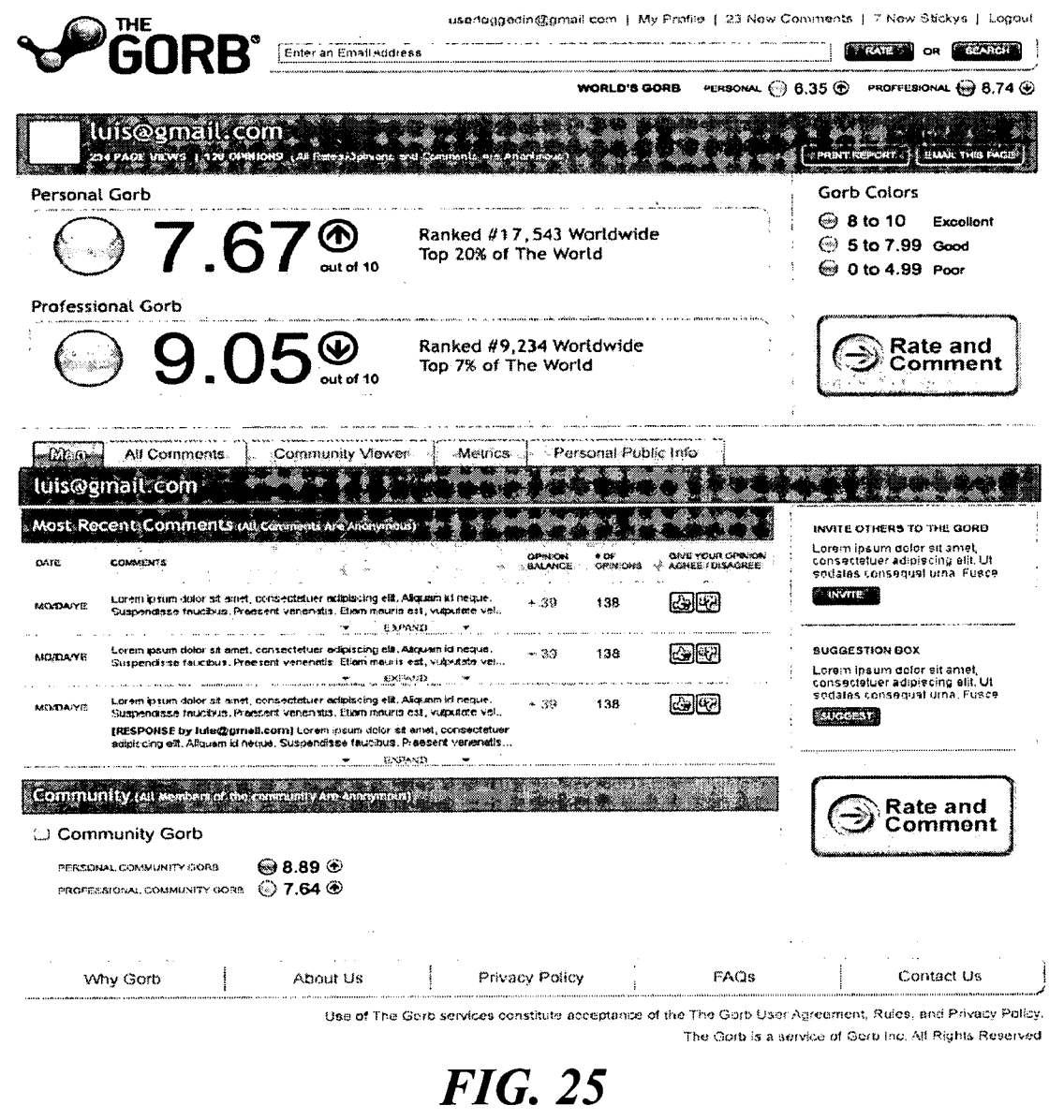
Figure 26:
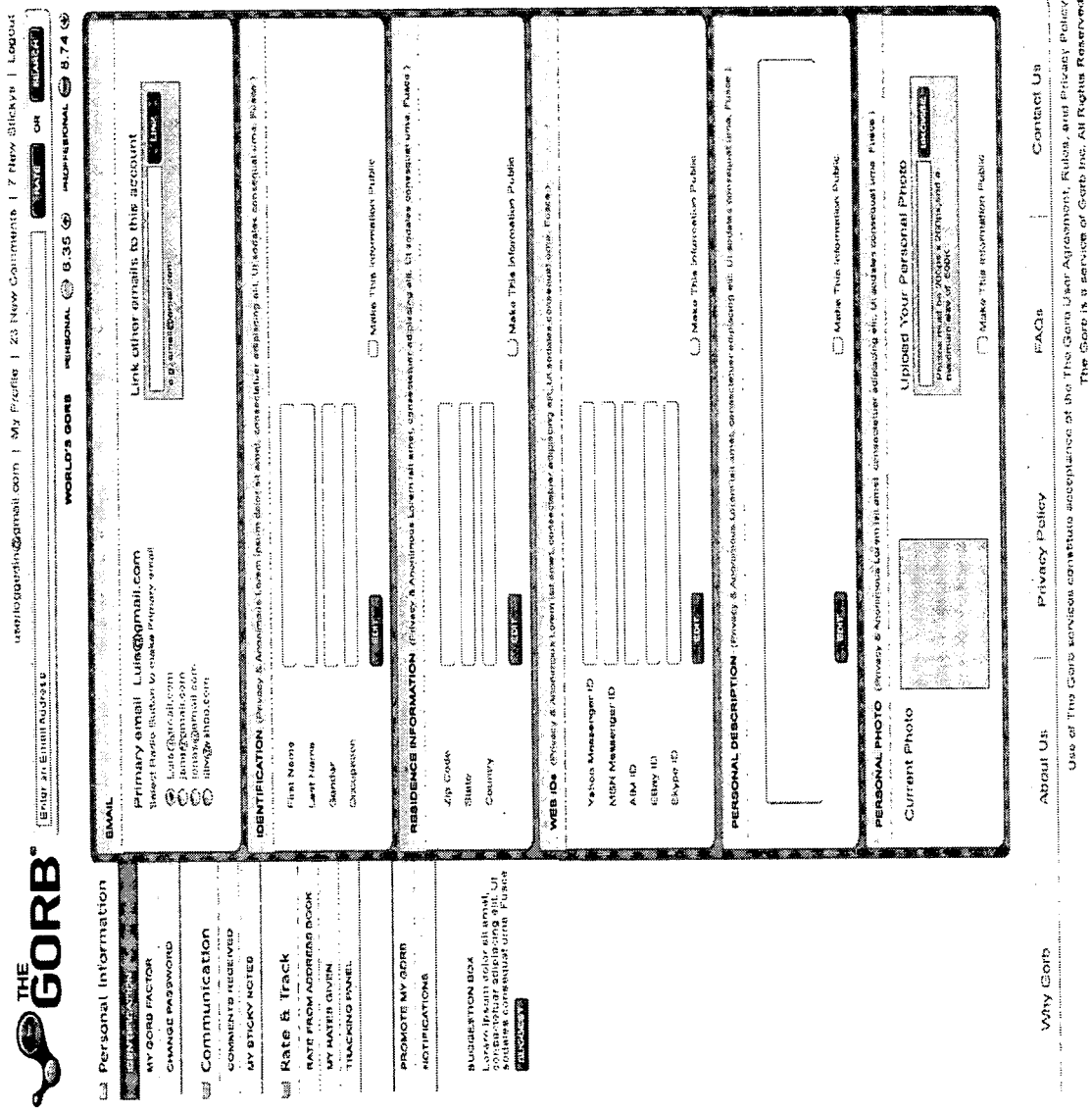
FIG. 26 is a screenshot of the profile identification page, according to the present invention.

One of the features of the gorb rating system is the profile page. FIG. 25 is a screenshot of the profile main page. This is the page a user sees when searching an email address of an entity, if the email address is in the system. The profile page displays information about that entity. From the profile main page as shown in FIG. 25, a user of the system can select various profile sub-pages, simply by clicking on a tab. FIG. 18 is the profile personal information sub-page, viewable by selecting the "Personal Public Info" tab. It displays the personal information supplied by the rater. Only registered users can have this information entered into the system. A registered user enters his/her personal information into the profile identification page as shown in FIG. 26. This information is stored in the History Repository 270.

Figure 19:
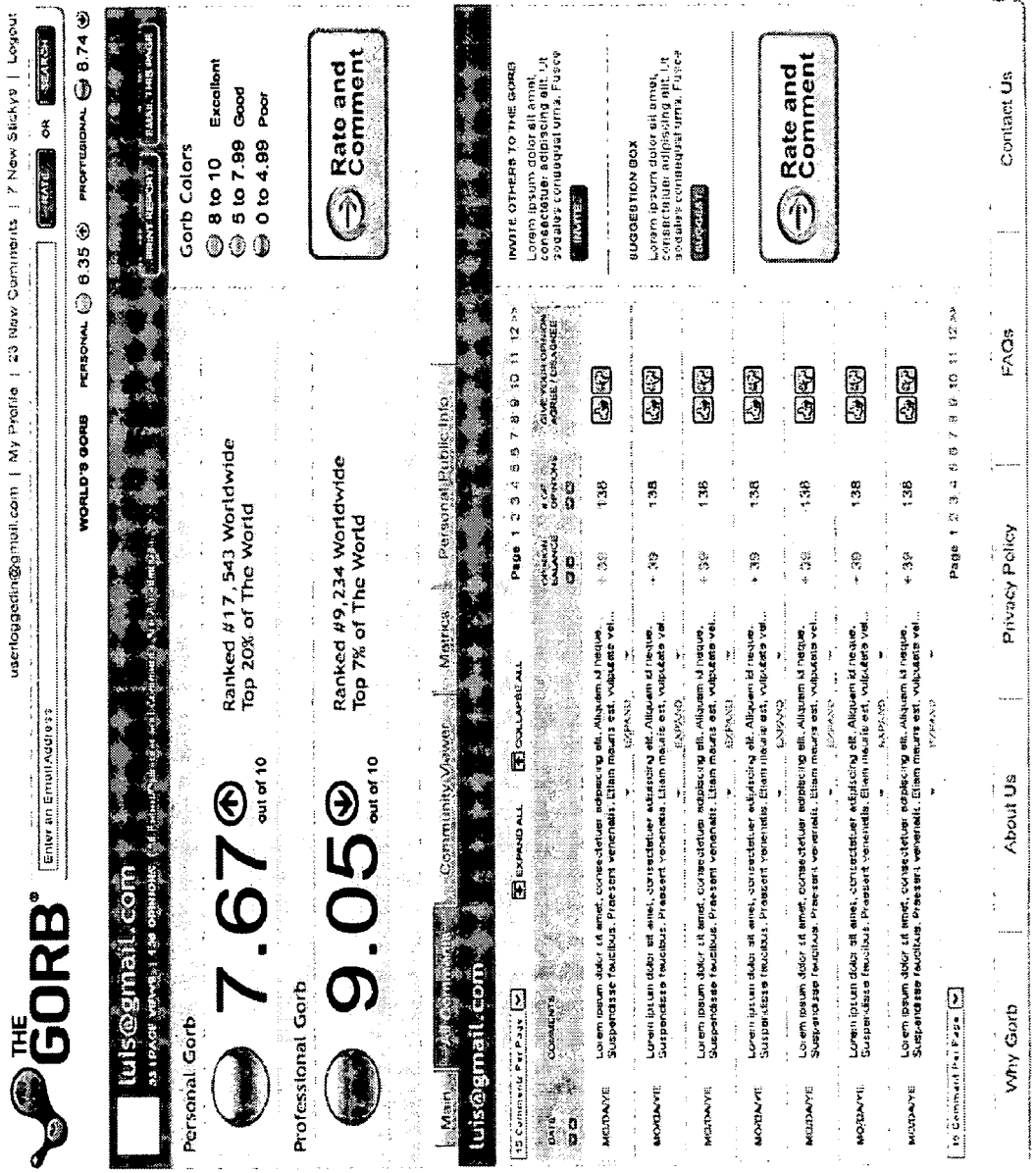
FIG. 19 is a screenshot of the profile comments sub-page, according to the present invention.

By selecting the tab marked "All Comments" from the profile main page as shown in FIG. 25, the user is directed to the profile comments page, as shown in FIG. 19, which lists the comments posted. Commenting will be discussed in more detail below.

Figure 24:
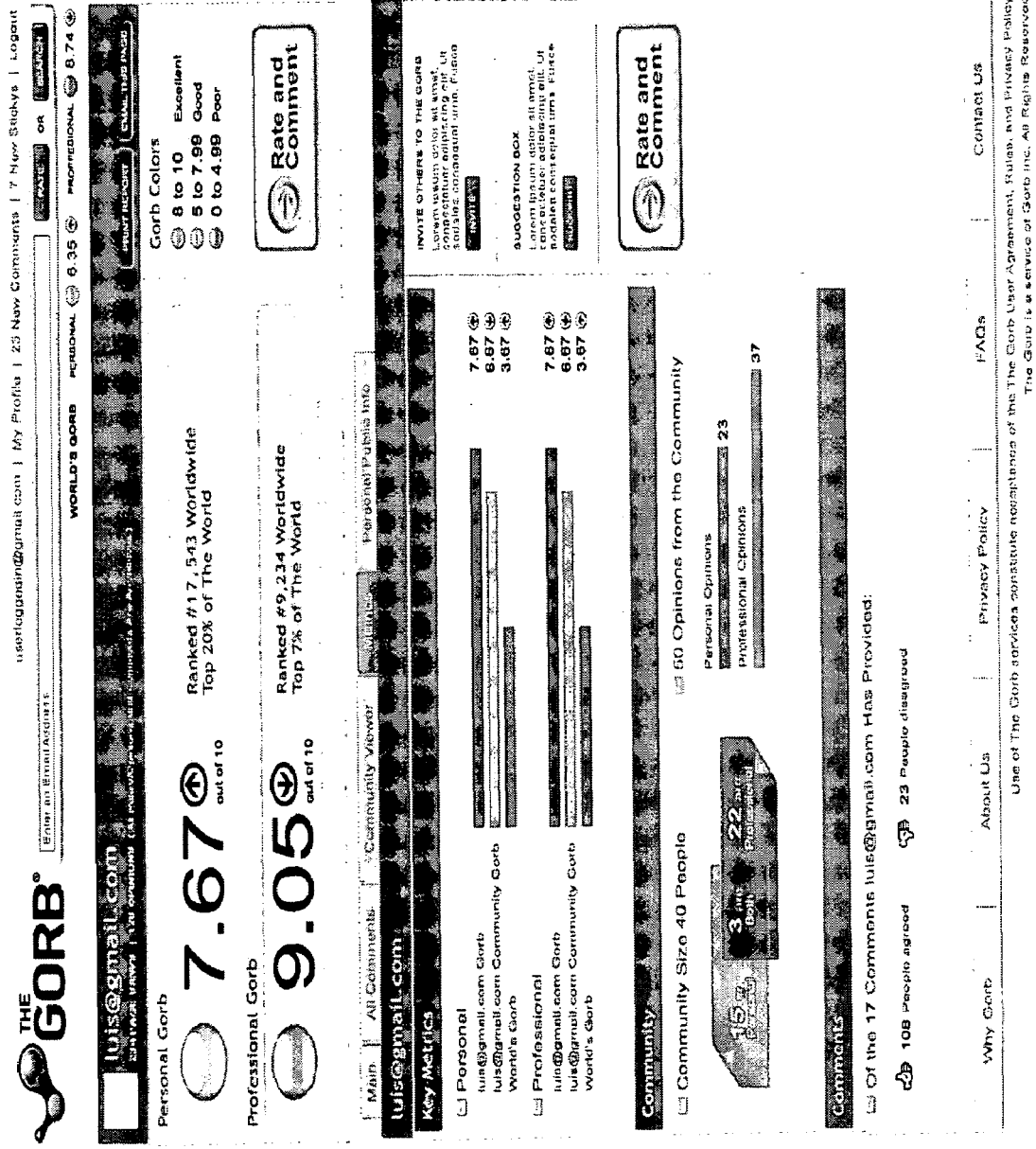
FIG. 24 is a screenshot of the profile metrics sub-page, according to the present invention.
Figure 27:
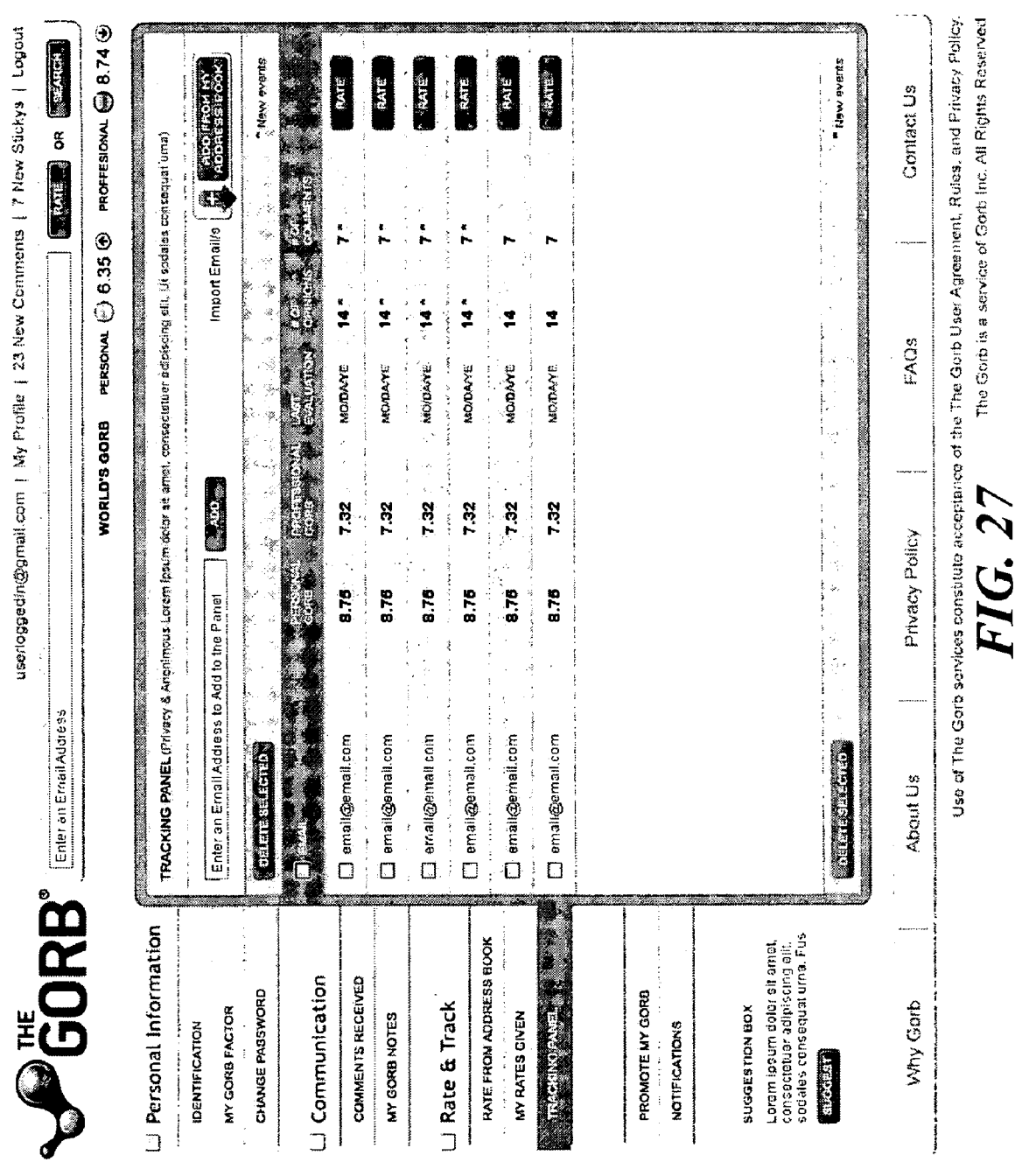

The data stored in the history repository 270 and the ratings/comments repository 260 is manipulated in various ways to produce metrics. The profile metrics page as shown in FIG. 24 provides one example of the ways in which the stored data can be manipulated for useful purposes. FIG. 24 is one of the sub-pages of the main profile page of FIG. 25. The profile metrics page is the page shown when a user selects the "Metrics" tab on the main profile page. This page supplies the raw data from the system, manipulated into useful metrics. For example, the metrics page provides information about the entity's community, such as the size of the community and a demographic breakdown of the community. Also shown is the number of opinions received from the rater's community. To reiterate, an entity's community is the aggregate of the raters who have rated that entity. Also shown are personal and professional metrics regarding the entity. Another useful tool available to registered users is the profile tracking panel, as shown in FIG. 27. This panel allows registered users to track the ratings and metrics for designated entities.

Figure 28:
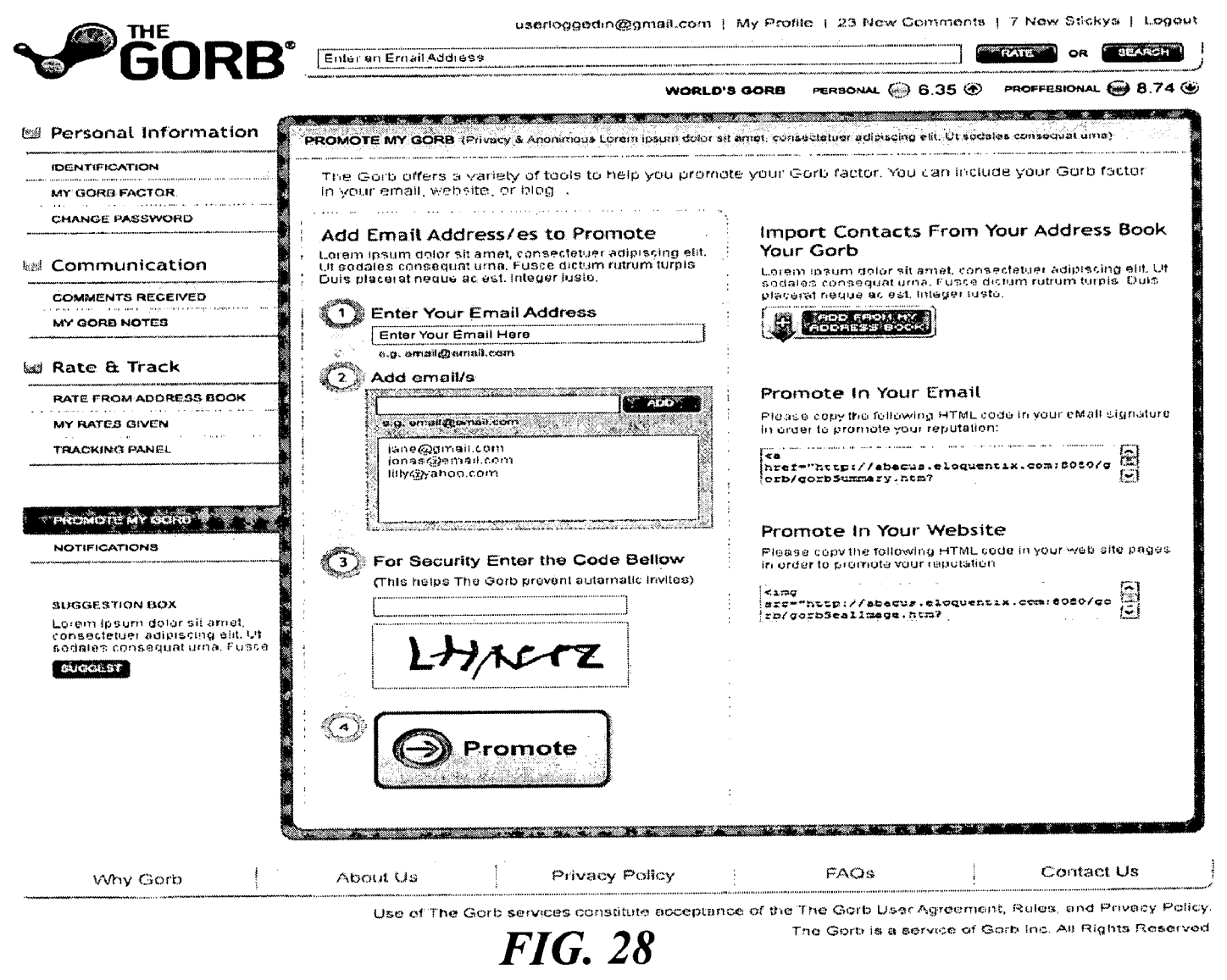

A further feature is shown in FIG. 28. FIG. 28 is a screenshot of the promote page. This page enables a user to promote his/her GORB rating by sending email notifications to designated recipients. The designated recipients will be sent an email containing the URL of the user's profile page. The email addresses can be entered manually or imported from the user's address book. This page also provides a URL that a user can conveniently copy and paste into his/her email signature and/or his/her website. This is yet another way of promoting a GORB rating.

Figure 13:
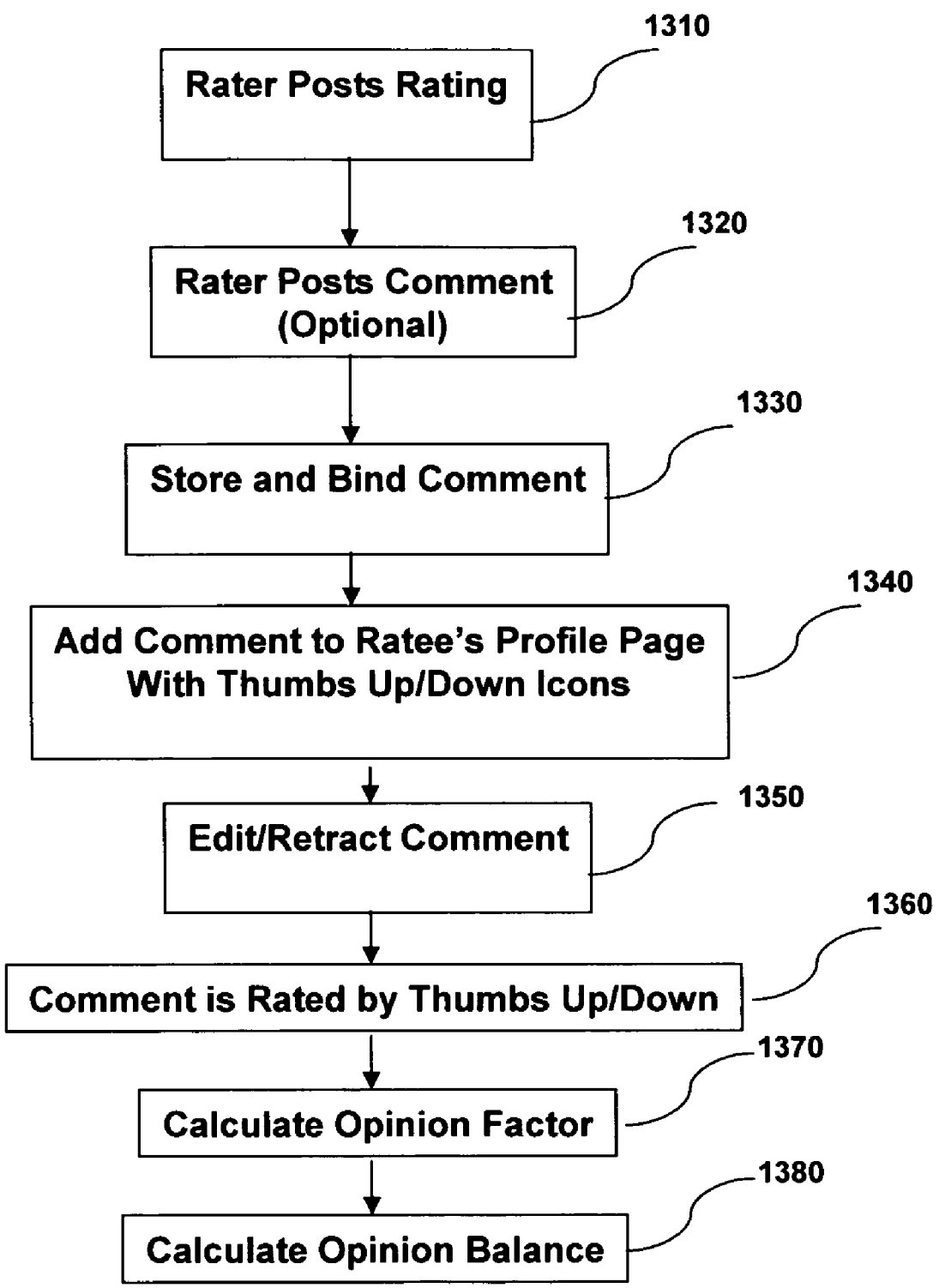
FIG. 13 is a flowchart of the comment process, according to an embodiment of the present invention.
Figure 20:
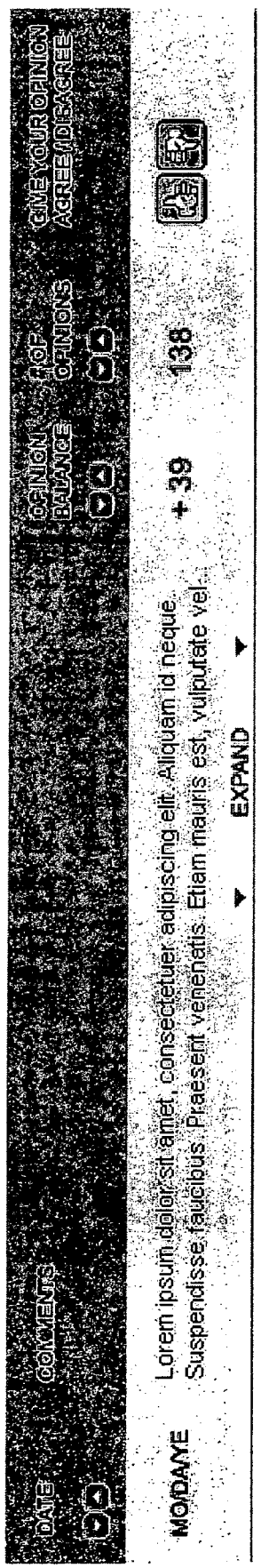
FIG. 20 is a screenshot of a comment page illustrating the thumbs up/thumbs down icons.

As stated earlier, in addition to posting a rating, a rater has the option of posting a comment. The comment may be entered as free-form text in a text box. Any user, whether registered or not, can enter a comment. See FIG. 15 which shows the comment text box. The rater is free to express him/herself in any way. The GORB system does not censor comments. Referring to FIG. 13 there is shown a flowchart of the comment process, according to an embodiment of the present invention. The first step 1310 occurs when a rater posts a rating of an entity. A rater must post a rating in order to post a comment, yet posting the comment is optional. Once a rater opts to post a comment in step 1320, the comment is then stored in the rating/comment repository 260 in the database 150 in step 1330 (and bound to both the rater and the entity's history in the history repository 270). The comment is next added to the entity's profile page in step 1340. The comment will be presented on the entity's profile page along with two icons indicating agreement and disagreement. In this example, one icon is the "Thumbs Up" icon, which common usage defines as "in agreement with." The other icon shown is the "Thumbs Down" icon which common usage defines as "not in agreement with; or opposed to." See FIG. 20 for a screenshot of the comment screen showing the Thumbs Up, Thumbs Down icons. After the user has posted a comment, the comment is immediately available for viewing. At this point, a registered user can select to edit or delete the comment in step 1360. Only registered users can edit comments. Any user can delete a comment. The registered rater can choose to edit the comment by selecting the "Edit" box. A rater can also choose to retract or delete a comment entirely by selecting the "Delete" box. A user is allowed to modify a comment at any time up until the comment has received a response. Once a comment has received a response, it cannot be changed. A comment can be deleted at any time.

The Thumbs Up/Down icons are a way to allow the community of raters in the GORB system to "rate" a comment. This is a novel feedback mechanism which provides a forum for users to express their views about the ratings provided by others. By selecting either the "Thumbs Up" or the "Thumbs Down" in step 1360 a registered user can state his/her agreement or disagreement with a posted comment. In step 1370 an opinion factor is calculated as the average of the favorable and unfavorable ratings of the comment. Although comment ratings do not directly affect the GORB rating, the comment ratings provide an additional opinion factor which a user may factor in to a personal decision as to whether or not to accept a GORB rating. In step 1380 an opinion balance is calculated as the difference between the favorable and unfavorable opinion factors. The opinion balance is displayed next to the comment shown in FIG. 19. Also shown is the number of opinions posted about this comment.

The comments are not processed by the GORB algorithm in any way other than to display and store the comments and to allow a rater to retract a comment before someone has evaluated the comment. The comments are merely provided as an open on-line forum for users of the system to express their opinions.

Figure 21:
FIG. 21 is a screenshot of the GORB notes mailbox according to an embodiment of the invention.
Figure 22:
FIG. 22 is a screenshot of the GORB notes page for composing an email, according to the present invention.

Registered users have access to an additional feature referred to as "GORB Notes." This feature, as shown in FIG. 21, allows registered users to send anonymous emails from the GORB system to any email address. These emails are considered anonymous because the sender's address is not revealed, therefore the sender's identity is not revealed. From the GORB mailbox shown in FIG. 21, a user selects the tab marked "Compose a GORB note" which directs the user to the compose page shown as FIG. 22. On this page the user inputs the email address and the message. The GORB mailbox also allows users to receive emails through the GORB system. Registered users also have the option of uploading their electronic address books into the GORB system, as shown in FIG. 27.

Figure 23:
FIG. 23 is a screenshot of the GORB notifications page, according to the present invention.

Another feature available to registered users is the ability to receive notification of ratings posted to the user. FIG. 23 shows a notifications page. The user has the option of selecting to be notified every time he/she is rated, or on a scheduled basis, such as weekly or monthly.

CONCLUSION

Therefore, while there have been described what are presently considered to be the preferred embodiments, it will understood by those skilled in the art that other modifications can be made within the spirit of the invention.

We claim:

1. A method for rating an entity, the method comprising steps of:
   receiving a bounded rating of the entity from a rater, wherein the bounded rating is a first number selected from a bounded interval of real numbers;
   retrieving a bounded current rating for the entity from a persistent storage, wherein the bounded current rating is a second number selected from the bounded interval of real numbers;
   transforming the bounded rating into an unbounded rating by applying a functional transformation;
   transforming the bounded current rating into an unbounded current rating by applying the functional transformation;
   retrieving a reliability score for the rater from the persistent storage;
   retrieving a reliability score for the current rating of the entity from the persistent storage;
   computing a new unbounded rating as a weighted average of the entity's unbounded current rating and unbounded rating, wherein a first weight is equal to the current rating's reliability score and a second weight is equal to the rater's reliability score;
   computing a new reliability score for the new unbounded rating by adding the rater's reliability score to the current rating's reliability score;
   converting the new unbounded rating into a new bounded rating by applying an inverse of the functional transformation used to convert a bounded value into an unbounded value;
   setting the bounded current rating for the entity equal to the new bounded rating;
   setting the reliability score for the entity equal to the new reliability score;
   storing the new reliability score in the persistent storage; and
   storing the new bounded rating in the persistent storage.

2. The method of claim 1, further comprising steps of:
   determining a systematic bias score for the rater;
   computing an unbiased unbounded rating by subtracting the rater's systematic bias score from the unbounded rating;
   computing a new unbiased unbounded rating as a weighted average of the entity's unbounded current rating and unbiased unbounded rating, wherein the first weight is equal to the current rating's reliability score and the second weight is equal to the rater's reliability score; and
   converting the new unbiased unbounded rating into the new bounded rating by applying an inverse of the functional transformation used to convert the bounded value into the unbounded value.

3. The method of claim 2, wherein the step of determining the systematic bias of the rater comprises steps of:
   computing a function of a difference for each rating posted by the rater for an entity, wherein the difference is between the rating posted by the rater for the entity, and the current rating of the entity; and
   setting the systematic bias equal to a weighted average of each of the functions wherein the weights are proportional to the reliability scores of the current ratings of their respective entities.

4. The method of claim 1, further comprising steps of:
   multiplying the current rating's reliability score by a factor that is a decreasing function of time elapsed between a most recent rating posted for the entity and the current rating of the entity to produce a time decayed reliability score for the current rating;
   computing the new unbounded rating as the weighted average of the entity's unbounded current rating and unbounded rating, wherein a first weight is equal to a time decayed score of the current rating and the second weight is equal to the rater's reliability score;
   computing the new reliability score for the new unbounded rating by adding the rater's reliability score to the current rating's time decayed reliability score; and
   converting the new unbounded rating into the new bounded rating by applying an inverse of the functional transformation used to covert the bounded value into the unbounded value.

5. The method of claim 1, further comprising steps of:
   converting the rating received from a first rater for the entity into a probabilistic forecast of a subsequent rating received from a second rater for the entity;

assigning an individual score to the subsequent rating received for the entity, relative to the probabilistic forecast, wherein the individual score is partially computed using a proper scoring rule;

computing a quality score for the probabilistic forecast wherein the quality score is a function of the individual scores assigned to a subset of subsequent ratings received for the entity relative to the probabilistic forecast;

computing a raw rater score as a weighted average of the quality scores assigned to a subset of the probabilistic forecasts generated from that rater's previously posted ratings;

computing the first rater's reliability score as a function of the raw rater score of the first rater and the average raw rater score of all other raters.

6. The method of claim 5, wherein converting the first rating for the entity into the probabilistic forecast of the subsequent rating received by the second rater for the entity further comprises steps of:

computing the entity's estimated standard deviation, wherein this estimate is partially based on a standard deviation of a subset of ratings previously posted for the entity; and assigning a probability density function to future ratings posted for the entity such that the mean of an associated probability distribution is equal to the first rating and the standard deviation of the associated probability distribution is equal to the estimated standard deviation.

7. The method of claim 5, further comprising steps of:
receiving a first email identifier used by the first rater;
computing a verification score associated with the email identifier;
computing an intermediate rater reliability score as a function of the raw rater score and the average of every rater's raw rater score;
computing a final rater reliability score as a function of the intermediate rater reliability score and the email identifier verification score.

8. The method of claim 7 wherein computing the verification score associated with the first email identifier used by the first rater further comprises steps of:

computing an initial verification score of the first email identifier;
computing a verification adjustment factor associated with each second rater who has rated the first rater; and
adding all verification adjustment factors associated with second raters who have rated the first rater to the initial verification score to compute a final verification score.

9. The method of claim 8 wherein the initial verification score is a decreasing function of the ease with which an individual can obtain an email address from the email address provider organization.

10. The method of claim 8 wherein computing the verification adjustment factor associated with the first rater comprises steps of:

receiving the first email identifier associated with the first rater
computing the initial verification score associated with the first email identifier;
computing the verification adjustment factor as a function of the initial verification score and the number of entities that the first rater has rated so far, wherein this function is an increasing function of the initial verification score and a decreasing function of the number of entities that the first rater has rated so far.

11. The method of claim 1 wherein the functional transformation comprises transforming a variable which falls within the bounded interval of real numbers into a variable which is not bound within any bounded interval of real numbers.

12. The method of claim 1 wherein the first number and the second number are generated from a same bounded interval of real numbers.

13. The method of claim 1 further comprising steps of:
receiving a comment from the rater, wherein the comment is a free-form text message;
binding the comment to the bounded rating received from the rater;
storing the comment in the persistent storage;
displaying the comment along with a first icon indicating agreement and a second icon indicating disagreement in close proximity to the comment, such that the first and second icons are easily identifiable as being associated with the comment, wherein the first and second icons are selectable by the rater to indicate either agreement or disagreement with the comment;
accepting selections of the first and second icons;
calculating a favorable opinion factor as a sum of the selections of the first icons; and
calculating an unfavorable opinion factor as a sum of the selections of the second icons.

14. The method of claim 13 further comprising steps of:
calculating an opinion factor as the average of the favorable opinion factor and the unfavorable opinion factor;
calculating an opinion balance as the difference between the favorable opinion factor and the unfavorable opinion factor;
storing the opinion factor in the persistent storage;
storing the opinion balance in the persistent storage;
displaying the opinion factor; and
displaying the opinion balance.

15. The method of claim 13 further comprising a step of:
enabling the rater to edit the comment if one or another of the icons associated with the comment have not been selected.

16. The method of claim 13 further comprising a step of:
enabling the rater to delete the comment.

17. The method of claim 1 further comprising a step of:
displaying the new bounded rating.

18. The method of claim 17 further comprising steps of:
assigning a visual indicator to the rating, the visual indicator for providing an indication of the ranking of the rating, based upon a pre-selected tier of rankings, wherein
a first tier is associated with a low ranking, indicating that the rating falls within a lowest pre-selected range of bounded integers;
a second tier is associated with a medium ranking indicating that the rating falls within a middle pre-selected range of bounded integers;
a third tier is associated with a high ranking indicating that the rating falls within a highest pre-selected range of bounded integers; and
displaying the visual indicator in close proximity to the rating.

19. The method of claim 17 wherein the step of displaying the new bounded rating further comprises steps of:
determining that the reliability score of the new bounded rating exceeds a threshold, wherein the threshold is inversely proportional to the bounded current rating;
displaying the new bounded rating if the reliability score of the new bounded rating exceeds the threshold; and displaying a message to the rater if the reliability score of the new bounded rating does not exceed the threshold.

20. The method of claim 17 wherein the step of displaying the new bounded rating further comprises steps of:
sending a verification email to the email address supplied by the rater, the verification email for requesting confirmation that the email address is valid;
determining that the email address is valid upon receipt of a confirmation email from the rater at the email address supplied by the rater, before displaying the new bounded rating.

21. The method of claim 1 further comprising steps of:
calculating a community rating as an average of all ratings posted for the entity; and
displaying the community rating.

22. The method of claim 21 further comprising steps of:
calculating a world rating as an average of all ratings posted for all entities; and
displaying the world ratings.

23. The method of claim 22 further comprising steps of:
calculating a plurality of metrics from raw data retrieved from the persistent storage, the raw data comprising details about the entity and other entities in the system; and
displaying the plurality of metrics with visual indicators that indicate relationships between the plurality of metrics displayed.

24. An information processing system for rating an entity, the system comprising:
a user interface for interacting with a rater;
a network connection;
a persistent storage;
a memory for storing software instructions; and
a processor operatively connected to the memory, the processor for executing the software instructions; wherein the software instructions enable the processor to:
receive a bounded rating of the entity from the rater, wherein the bounded rating is a first number selected from a bounded interval of real numbers;
retrieve a bounded current rating for the entity from the persistent storage, wherein the bounded current rating is a second number selected from the bounded interval of real numbers;
transform the bounded rating into an unbounded rating by applying a functional transformation;
transform the bounded current rating into an unbounded current rating by applying the functional transformation;
retrieve a reliability score for the rater from the persistent storage;
retrieve a reliability score for the current rating of the entity from the persistent storage;
compute a new unbounded rating as a weighted average of the entity's unbounded current rating and unbounded rating, wherein a first weight is equal to the current rating's reliability score and a second weight is equal to the rater's reliability score;
compute a new reliability score for the new unbounded rating by adding the rater's reliability score to the current rating's reliability score;
convert the new unbounded rating into a new bounded rating by applying an inverse of the functional transformation used to convert a bounded value into an unbounded value;
set the current rating for the entity equal to the new bounded rating;
set the reliability score for the entity equal to the new reliability score;
store the new bounded rating in the persistent storage; and
store the new reliability score in the persistent storage.

25. The system of claim 24, further comprising:
an electronic mail receipt and delivery system for enabling a user of the system to receive emails and to send anonymous emails.

26. A computer readable medium for storing a computer program product comprising software code for:
receiving a bounded rating of an entity from a rater, wherein the bounded rating is a first number selected from a bounded interval of real numbers;
retrieving a bounded current rating for the entity from a persistent storage, wherein the bounded current rating is a second number selected from the bounded interval of real numbers;
transforming the bounded rating into an unbounded rating by applying a functional transformation;
transforming the bounded current rating into an unbounded current rating by applying the functional transformation;
retrieving a reliability score for the rater from the persistent storage;
retrieving a reliability score for the current rating of the entity from the persistent storage;
computing a new unbounded rating as a weighted average of the entity's unbounded current rating and unbounded rating, wherein a first weight is equal to the current rating's reliability score and a second weight is equal to the rater's reliability score;
computing a reliability score for the new unbounded rating by adding the rater's reliability score to the current rating's reliability score;
converting the new unbounded rating into a new bounded rating by applying an inverse of the functional transformation used to convert a bounded value into an unbounded value; and
storing the new bounded rating in the persistent storage.

* * * * *